United States Patent
Agiwal et al.

(10) Patent No.: US 11,252,760 B2
(45) Date of Patent: Feb. 15, 2022

(54) METHOD AND WIRELESS COMMUNICATION SYSTEM FOR HANDLING TIMER OPERATION

(71) Applicant: Samsung Electronics Co., Ltd., Suwon-si (KR)

(72) Inventors: Anil Agiwal, Bangalore (IN); Abhishek Kumar Singh, Bangalore (IN); Pravjyot Singh Deogun, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/251,157

(22) PCT Filed: Jun. 13, 2019

(86) PCT No.: PCT/KR2019/007141
§ 371 (c)(1),
(2) Date: Dec. 10, 2020

(87) PCT Pub. No.: WO2019/240512
PCT Pub. Date: Dec. 19, 2019

(65) Prior Publication Data
US 2021/0282187 A1    Sep. 9, 2021

(30) Foreign Application Priority Data

Jun. 13, 2018 (IN) .............................. 201841022151
Jun. 12, 2019 (IN) .............................. 201841022151

(51) Int. Cl.
*H04W 74/08* (2009.01)
*H04W 76/28* (2018.01)
(Continued)

(52) U.S. Cl.
CPC ... *H04W 74/0816* (2013.01); *H04W 28/0278* (2013.01); *H04W 74/008* (2013.01);
(Continued)

(58) Field of Classification Search
CPC ......... H04W 28/0278; H04W 72/1289; H04W 74/008; H04W 74/0808; H04W 74/0816;
(Continued)

(56) References Cited

U.S. PATENT DOCUMENTS 10,178,696 B2    1/2019 Cheng et al.
10,462,761 B2*  10/2019 Li .......................... H04L 5/0094
(Continued)

FOREIGN PATENT DOCUMENTS

CN    107439048 A    12/2017
WO    2018081101 A2    5/2018

OTHER PUBLICATIONS

Office Action dated Jun. 7, 2021 in connection with India Patent Application No. 201841022151, 8 pages.
(Continued)

*Primary Examiner* — Kashif Siddiqui

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Accordingly, the embodiments herein disclose a method for handling a timer operation in a wireless communication system (300). The method includes receiving, by a UE (100), a signaling message from a base station (200).
(Continued)

The signaling message includes an information about acquired COT of the base station (200). Further, the method includes indicating, by the UE (100), about the acquired COT to a MAC layer from a physical layer. The physical layer indicates one of the base station (200) has acquired the COT for transmission and the base station (200) has missed a transmission opportunity due to a LBT failure.

15 Claims, 5 Drawing Sheets

(51) Int. Cl.
  *H04W 28/02* (2009.01)
  *H04W 74/00* (2009.01)
  *H04W 80/02* (2009.01)
(52) U.S. Cl.
  CPC ....... *H04W 74/0841* (2013.01); *H04W 76/28* (2018.02); *H04W 80/02* (2013.01)
(58) Field of Classification Search
  CPC .. H04W 74/0841; H04W 76/28; H04W 80/02
  See application file for complete search history.

(56) References Cited

U.S. PATENT DOCUMENTS

| | | |
|---|---|---|
| 2017/0188387 A1 | 6/2017 | Mukherjee et al. |
| 2017/0231011 A1 | 8/2017 | Park et al. |
| 2018/0115347 A1* | 4/2018 | Yerramalli .......... H04W 74/004 |
| 2020/0037354 A1* | 1/2020 | Li ........................ H04L 5/1469 |
| 2021/0344451 A1* | 11/2021 | Hedayat ................ H04L 1/1819 |

OTHER PUBLICATIONS

International Search Report and Written Opinion of the International Searching Authority in connection with International Application No. PCT/KR2019/007141 dated Sep. 19, 2019, 9 pages.
Intel Corporation, "Channel access mechanism for autonomous UL transmission," R1-1720030, 3GPP TSG RAN WG1 Meeting #91, Reno, Nevada, Nov. 27-Dec. 1, 2017, 6 pages.
Samsung, "Frame structure for NR-U," R1-1806758, 3GPP TSG RAN WG1 Meeting #93, Busan, Korea, May 21-25, 2018, 4 pages.
Samsung, "Enhancements on configured grant for NR-U," R1-1806764, 3GPP TSG RAN WG1 Meeting #93, Busan, Korea, May 21-25, 2018, 4 pages.
3GPP TS 38.321 V16.2.1 (Sep. 2020), Technical Specification, 3rd Generation Partnership Project; Technical Specification Group Radio Access Network; NR; Medium Access Control (MAC) protocol specification (Release 16), Sep. 2020, 154 pages.

* cited by examiner

[Fig. 1a]
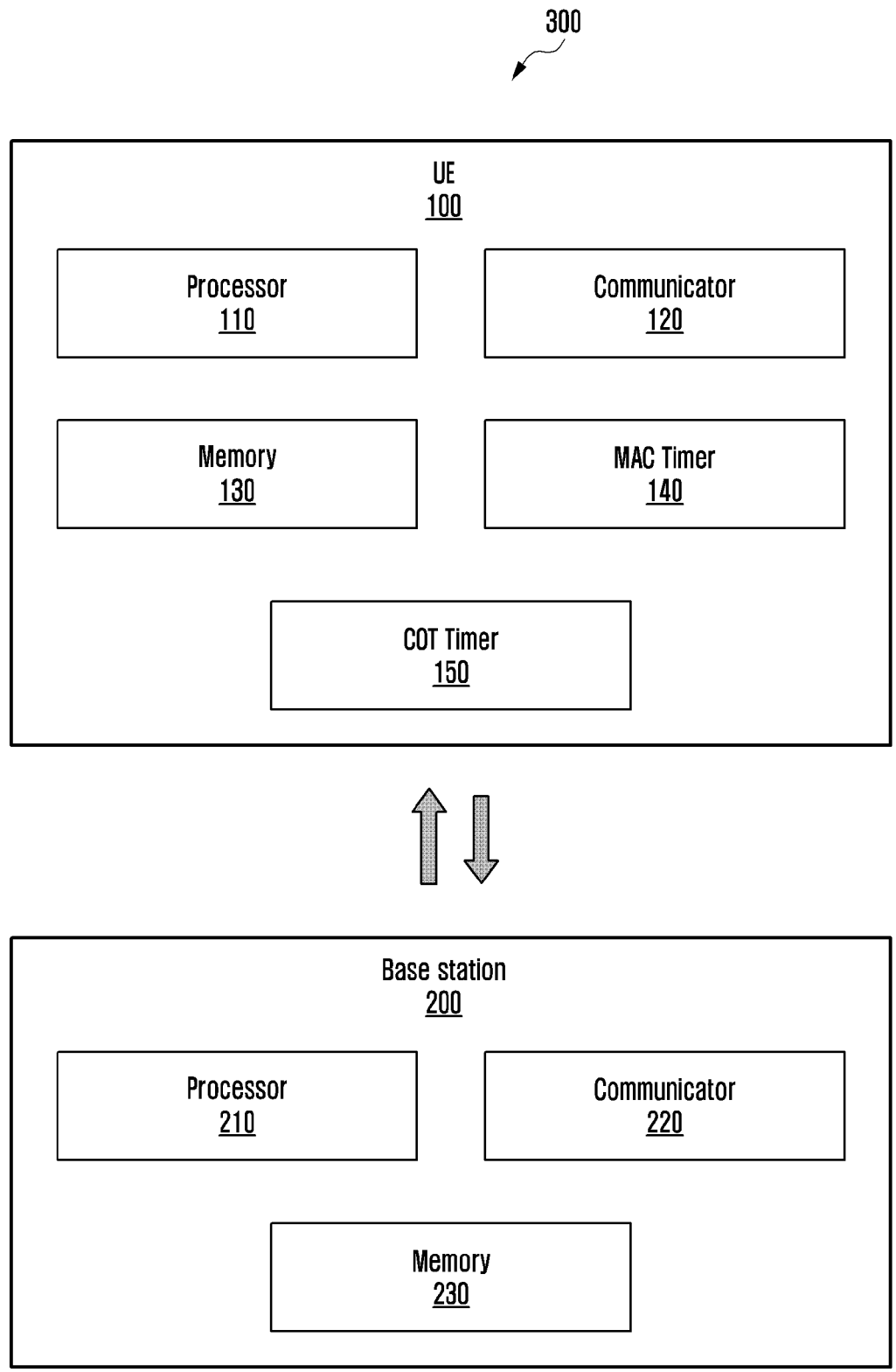

[Fig. 1b]
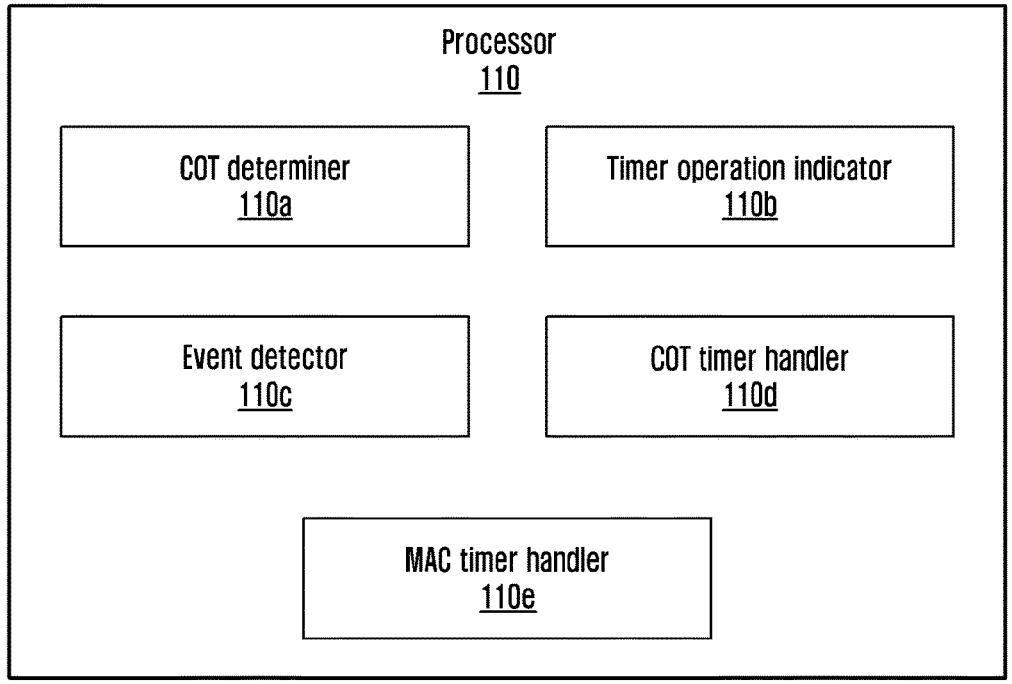
[Fig. 1c]
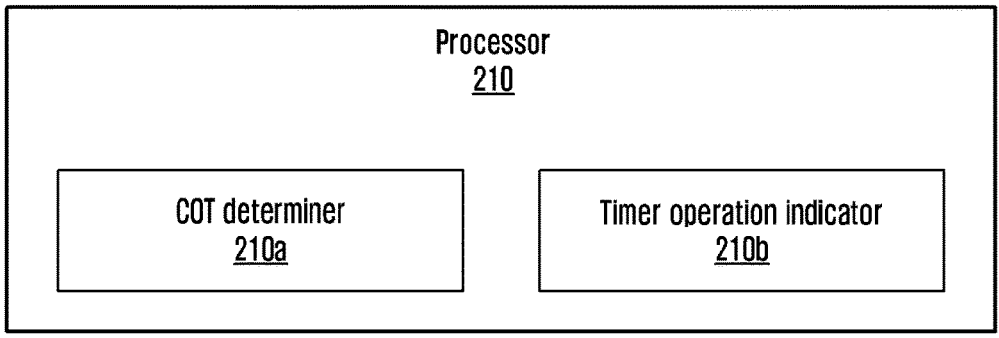
[Fig. 2a]
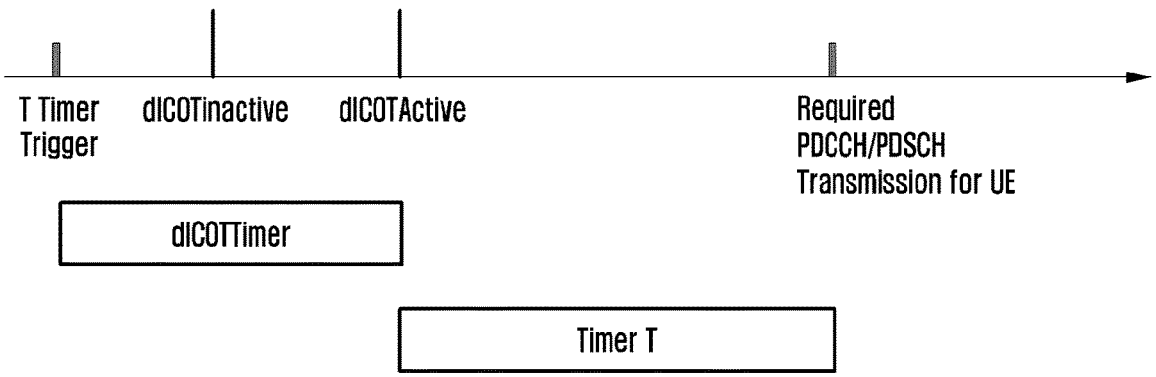

[Fig. 2b]
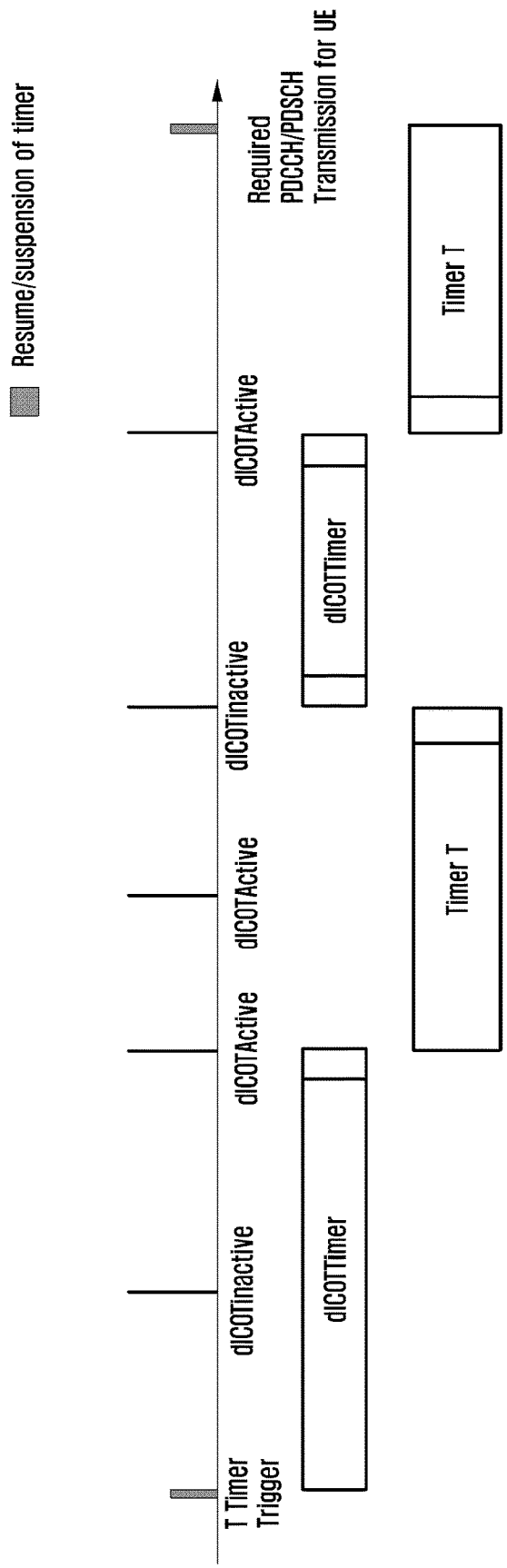

[Fig. 2c]
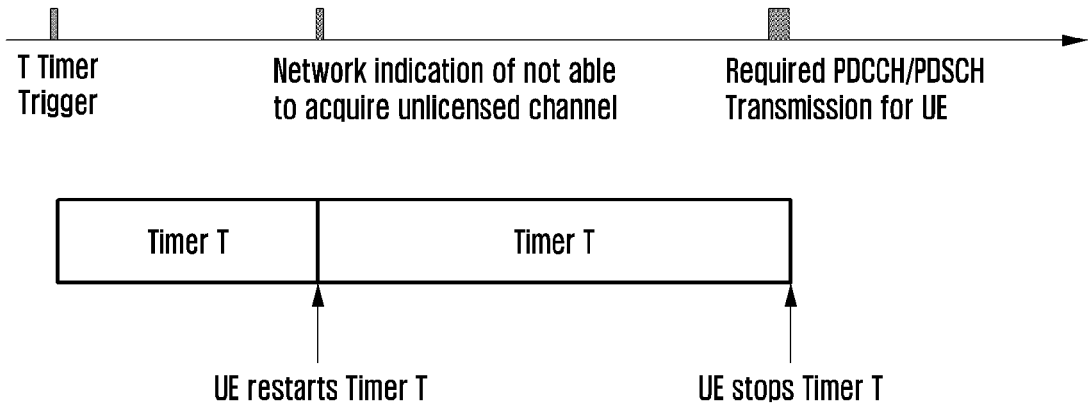
[Fig. 3]
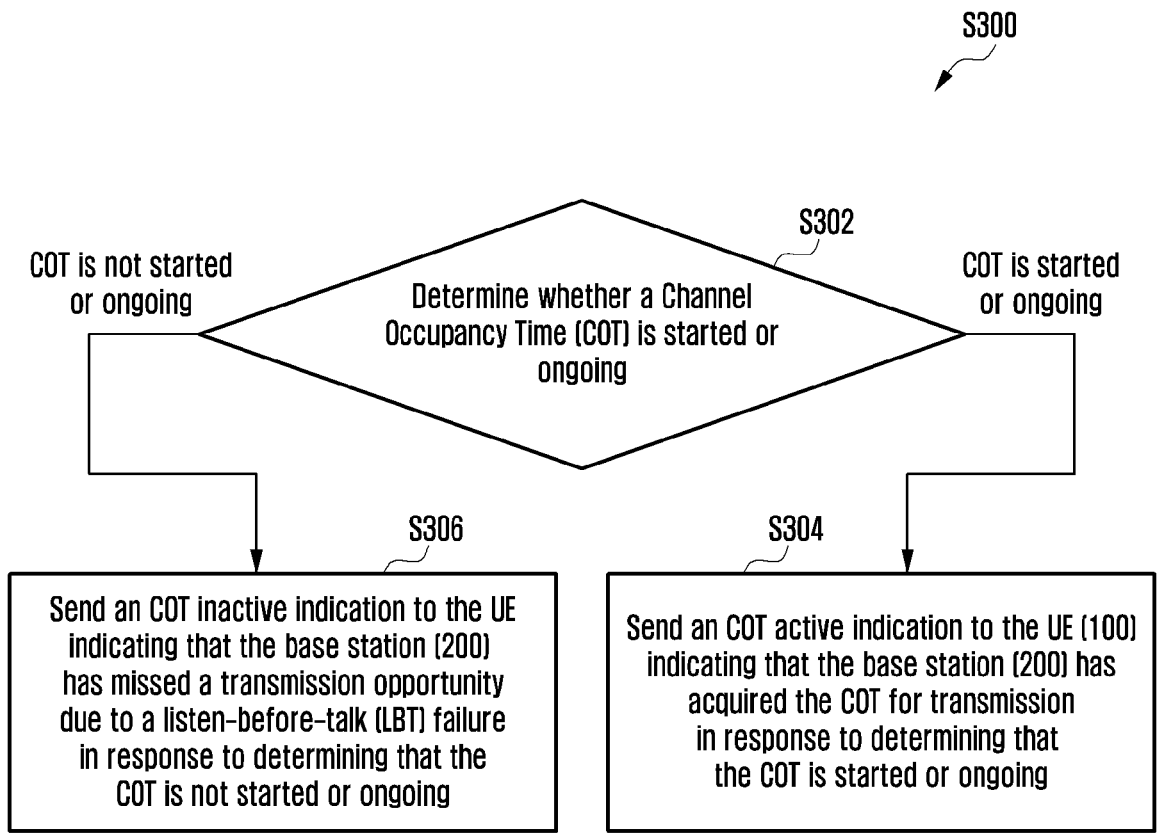

[Fig. 4]
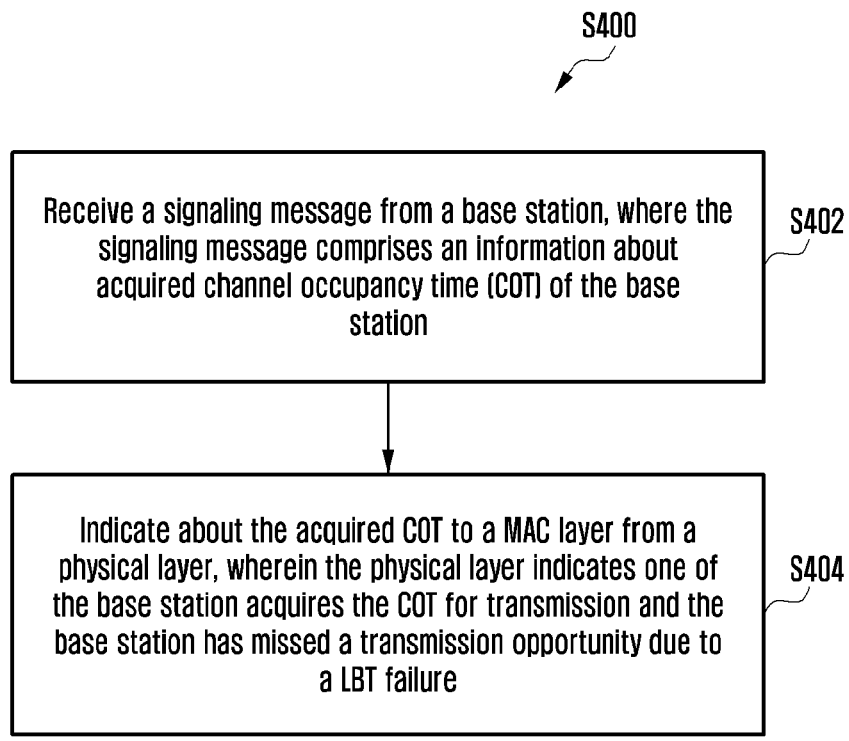

METHOD AND WIRELESS COMMUNICATION SYSTEM FOR HANDLING TIMER OPERATION

CROSS-REFERENCE TO RELATED APPLICATIONS

This application is a 371 National Stage of International Application No. PCT/KR2019/007141, filed Jun. 13, 2019, which claims priority to Indian Provisional Patent Application No. 201841022151, filed Jun. 13, 2018, and Indian Non-Provisional Patent Application No. 201841022151, filed Jun. 12, 2019, the disclosures of which are herein incorporated by reference in their entirety.

BACKGROUND

1. Field

The present disclosure relates to a method and wireless communication system for handling timer operation, and more specifically relates to a management of a medium access control (MAC) layer timers for a new radio (NR) unlicensed operation which work using a listen-before-talk in the wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

An NR operation in an unlicensed band requires a NB/user Equipment (UE) to perform a Listen before Talk (LBT) procedure before any transmission. If any other device (e.g., other UE) is using an unlicensed spectrum at that point of time, it is seen as an LBT Failure and the UE/NB cannot transmit until the LBT passes. As a result of the NB can miss transmission opportunities for critical transmissions like Physical Downlink Control Channel (PDCCH) Transmissions. Random Access channel (RACH) Procedure requires the UE to monitor for downlink assignment addressed to a Random Access Radio Network Temporary Identifier (RA-RNTI)/cell Radio Network Temporary Identifier (C-RNTI) (Random Access Response) for the duration of ra-ResponseWindow after transmission of a RACH preamble (as per 3GPP TS 38.321). If a response is not received within a window then it is assumed that the RACH preamble decoding has failed at the NB or RACH preamble did not reach the NB and the RACH failure is assumed. However, when the NR operates in the unlicensed band, the downlink assignment addressed to the RA-RNTI/C-RNTI may be delayed because of the LBT failures at the NB. Hence if the UE doesn't receive the appropriate downlink assignment within the window, the UE cannot differentiate whether it is the RACH Failure or the LBT Failure at the NB.

If the UE is successfully able to transmit message 3 (i.e., Msg3), then the UE monitors the PDCCH for a downlink assignment addressed to its TC-RNTI/C-RNTI and successful decoding of a message 4 (i.e., Msg4) (if applicable) as per 3GPP TS 38.321, for a duration of ra-ContentionResolutionTimer. If an appropriate downlink assignment and successfully decoded Msg4 (if applicable) is not received in the duration of ra-ContentionResolutionTimer, it is assumed that contention resolution has failed and the RACH failure is assumed. However, when the NR operates in the unlicensed band the downlink assignment addressed to TC-RNTI/C-RNTI and/or successfully decoded the Msg4 (if applicable) may be delayed because of the LBT failures at the NB. Hence, if the UE doesn't receive the appropriate downlink assignment within the window, the UE cannot differentiate whether it is the RACH Failure or the LBT Failure at the NB. Due to possibility of the LBT Failure based absence of appropriate DCI or downlink transmission required for a RAR/Contention resolution the UE cannot decide whether it is due to the RACH procedure failure or the LBT Failure.

Similar arguments as above are valid for DRX operation as well, absence of PDCCH corresponding to the UE can be because of either there is no downlink data transmission for the UE or because of inability of the NB to send PDCCH due to the LBT failures. Similarly for Scheduling Request (SR)/Buffer Status Report (BSR) procedures absence of PDCCH containing uplink grant, after BSR/SR has been sent can be due can be because of either there is SR/BSR was not decoded at NB or NB doesn't want to schedule or because of inability of NB to send PDCCH due to the LBT failures.

Thus, it is desired to address the above mentioned disadvantages or other shortcomings or at least provide a useful alternative.

In an embodiment, the COT active indication or the COT inactive indication are sent to the UE, from the base station (200), based on a signaling message. The signaling message includes at least one of a layer-1 message, a Medium Access Control-Control Element (MAC CE) message, and a Radio Resource Control (RRC) message.

In an embodiment, the COT inactive indication is send to the UE, when the base station acquires a channel using a short LBT, but the base station is unsuccessful to acquire the channel using a long LBT.

Accordingly, the embodiments herein disclose a method for handling a timer operation in a wireless communication system. The method includes receiving, by a UE, a signaling message from a base station. The signaling message includes an information about acquired COT of the base station. Further, the method includes indicating, by the UE, about the acquired COT information to a MAC layer from a physical layer. The physical layer indicates one of the base station has acquired the COT for transmission and the base station has missed a transmission opportunity due to a LBT failure.

The timer operation can correspond to any timer in the MAC layer corresponding to a RAR, a CR, a SR, DRX, and a BSR.

In an embodiment, the information about the acquired COT of the base station is indicated based on at least one of a search space configuration, a CORESET configuration, and a monitoring time configuration.

In an embodiment, at least one of the search space configuration, the CORESET configuration, and the monitoring time configuration is provided for the UE to monitor for base station transmissions providing information about the acquired COT.

In an embodiment, the search space configuration comprises at least one of a time resource for a downlink signal monitoring, an information about at least one of Downlink Control Information (DCI) format, a Synchronization Signal Block (SSB), a Channel State Information Reference Signal (CSI-RS), and a preamble transmission to be monitored by the UE.

In an embodiment, the search space configuration is provided for a Physical Downlink Control Channel (PDCCH) monitoring corresponding to at least one of a RAR, a PDSCH and a PUSCH. In an embodiment, the monitoring time configuration comprises at least one of a Synchronization Signal Block (SSB) parameters, Channel State Information Reference Signal (CSI-RS), and preamble information, wherein the UE (100) is configured to monitor one of a separate DCI format, a SSB, a CSI-RS resource, and a preamble transmission from a cell within the search space configuration.

In an embodiment, the monitoring time configuration comprises at least one of time resources, time periodicity, offset and duration for monitoring at least one of a Synchronization Signal Block (SSB) parameter, a Channel State Information Reference Signal (CSI-RS), and a preamble information.

In an embodiment, the method includes detecting, by the UE, that an event to start a MAC timer is satisfied. Further, the method includes starting, by the UE, the COT timer instead of the MAC timer in response to the event to start the COT timer is satisfied. Further, the method includes receiving, by the UE, a COT active indication indicating that the base station acquires the COT for transmission. Further, the method includes stopping the COT timer and starting the MAC timer based on the COT active indication.

In an embodiment, the method includes stopping or pausing, by the UE, the MAC timer and resuming and restarting the COT timer when the UE receives a COT inactive indication indicating that the base station has missed a transmission opportunity due to a LBT failure. Further, the method includes stopping or pausing, by the UE, the COT timer and resuming or restarting the MAC timer based on the COT active indication.

In an embodiment, the event corresponds to one of receiving a Synchronization Signal Block (SSB) transmission information, a SSB transmission information from the base station corresponding to a SSB index associated with a transmitted Physical Random Access Channel (PRACH), a Channel State Information Reference Signal (CSI-RS) transmission from the base station corresponding to a serving cell, a CSI-RS transmission from the base station corresponding to the CSI-RS index of the serving cell associated with a transmitted PRACH, a Physical Downlink Control Channel (PDCCH) identified by a cell common Radio Network Temporary Identifier (RNTI) value, a preamble transmission from the base station indicating one of a start COT, an end COT, and an ongoing COT for the serving cell of the base station, and base station transmission according to the monitoring criteria defined for the MAC timer.

In an embodiment, the COT timer (150) is provided at least one of a common configuration for each MAC timer (140) and a separate configuration for each MAC timer (140) wherein the MAC timer (140) corresponding to same MAC procedure can have the same independent configuration, and wherein the common configuration is provided based on at least one of a per serving cell, a per bandwidth part, a per MAC entity basis.

In an embodiment, the configuration of the COT timer is modified through one of a RRC signalling message, a MAC CE based signalling message, a DCI based signalling message.

In an embodiment, the method includes detecting, by the UE, a failure event due to the LBT failure on expiry of a COT timer, wherein the failure event is a Random Access Response reception failure event, a contention resolution failure event, a scheduling request procedure failure event, a DRX procedure failure event, and a BSR procedure failure event.

In an embodiment, the method includes restarting, by the UE the MAC timer upon reception of a COT inactive indication.

In an embodiment, the UE starts a ra-response window based on one of the MAC layer instructs the physical layer to perform a PRACH transmission, the physical layer starts transmission on a first PRACH occasion, an end of PRACH transmission performed by the physical layer.

In an embodiment, the UE performs that at least one of a PREAMBLE_POWER_RAMPING_COUNTER is not incremented and the UE de-prioritizes a PRACH transmission using one of the SSB and the CSI-RS based RACH resources in case of a RAR failure due to LBT failure.

In an embodiment, the UE starts a ra-Contention Resolution timer based on at least one of the MAC layer instructs the physical layer to perform a RRC connection request message transmission, the physical layer starts transmission on a symbol/slot of the RRC connection request message, and an end of RRC connection request message transmission performed by the physical layer.

In an embodiment, the UE triggers a scheduling request (SR) and increments scheduling request (SR) counter by a predefined value, when the UE handles a SR failure based on the LBT failure.

In an embodiment, the UE maintains a counter value and waits for a counter to exceed an RRC configured threshold value prior to increasing a SR counter and triggering a SR or triggering a RACH, when the UE handles a SR failure based on the LBT failure.

Accordingly, the embodiments herein disclose a base station for handling a timer operation in a wireless communication system. The base station includes a processor coupled with a memory. The processor is configured to determine whether a COT is started or ongoing. The processor is configured to perform one of send an COT active indication to a UE indicating that the base station has acquired the COT for transmission in response to determine that the COT is started or ongoing, and send an COT inactive indication to the UE indicating that the base station has missed a transmission opportunity due to a listen-before-talk (LBT) failure in response to determine that the COT is not started or ongoing.

Accordingly, the embodiments herein disclose a UE for handling a timer operation in a wireless communication system. The UE includes a processor coupled with a memory. The processor is configured to receive a signaling message from a base station. The signaling message includes an information about acquired COT of the base station. The processor is configured to indicate about the acquired COT to a MAC layer from a physical layer. The physical layer indicates one of the base station acquires the COT for transmission and the base station has missed a transmission opportunity due to a LBT failure.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method and system for handling a timer operation in a wireless communication system. Accordingly, the embodiments herein disclose a method for handling a timer operation in a wireless communication system. The method includes determining, by a base station, whether a COT is started or ongoing. Further, the method includes performing, by the base station, one of: sending an COT active indication to a UE indicating that the base station has acquired the COT for transmission in response to determining that the COT is started or ongoing, and sending an COT inactive indication to the UE indicating that the base station has missed a transmission opportunity due to a listen-before-talk (LBT) failure in response to determining that the COT is not started or ongoing.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 1A is an overview of a wireless communication system for handling a timer operation, according to the embodiments as disclosed herein;

FIG. 1B is a block diagram of a processor included in a UE, according to the embodiments as disclosed herein;

FIG. 1C is a block diagram of a processor included in a base station, according to the embodiments as disclosed herein;

FIG. 2A is a schematic diagram illustrating a timer handling in a non-adaptive procedure, according to the embodiments as disclosed herein;

FIG. 2B is a schematic diagram illustrating a timer handling in an adaptive procedure, according to the embodiments as disclosed herein;

FIG. 2C is a schematic diagram illustrating a network indication based timer restart, according to the embodiments as disclosed herein;

FIG. 3 is a flow chart illustrating a method, implemented by the base station, for handling the timer operation in the wireless communication system, according to the embodiments as disclosed herein; and FIG. 4 is a flow chart illustrating a method, implemented by the UE, for handling the timer operation in the wireless communication system, according to the embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The following terminologies are used in the patent disclosure.

1. NR: New Radio. This term is synonymous to 5G.
2. LTE: Long Term Evolution. This term is synonymous to 4G.
3. RACH: Random access procedure done by a UE.
4. eNB: enhanced NodeB (LTE NodeB).
5. gNB: 5G NodeB.
6. RAR—Random access response.
7. PDCCH—Physical Downlink Control Channel.
8. DCI—Downlink Control Information.
9. SSB: Synchronization Signal Block. One synchronization signal block contains Primary Synchronization Signal, Secondary Synchronization Signal and Physical Broadcast Channel transmission.
10. LBT: Listen before talk. Before initiating transmission on an unlicensed channel, UE/NB is required to check if the unlicensed channel is being used for communication by any other device in vicinity. If no such device is found communicating in the unlicensed channel for a certain period of time, then UE/NB can initiate transmission on the unlicensed channel.
11. COT: Channel Occupancy Time. It the amount of time that a UE or NB can reserve the unlicensed channel for continuous data or control transmission. After UE/NB acquires the unlicensed channel using LBT operation. It can perform transmission over the unlicensed channel for the time indicated by Channel Occupancy Time. This transmission duration can also be referred to as transmission burst.

Accordingly, the embodiments herein provides a method for handling a timer operation in a wireless communication system. The method includes receiving, by a UE, a signaling message from a base station. The signaling message includes an information about acquired COT of the base station. Further, the method includes indicating, by the UE, about the acquired COT to a MAC layer from a physical layer. The physical layer indicates one of the base station has acquired the COT for transmission and the base station has missed a transmission opportunity due to a LBT failure.

In one embodiment, based on some radio signaling between the UE and the NB, lower layers (e.g. physical layer) of the UE will provide one of the two indications to UE's MAC Layer (dlCOTActive: NB is able to acquire COT for transmission and dlCOTInactive: NB has missed a transmission opportunity due to LBT Failures). The base station can transmit a Layer-1 (L1) message or Medium Access Control-Control Element (MAC CE) or Radio Resource Control (RRC) message which contains indication about acquired COT of the base station. In an example, UE's physical layer after receiving a downlink transmission from a serving cell (e.g. SSB or Channel State Indicator-Reference Signal (CSI-RS) or a PDCCH identified by a common cell identity or a downlink preamble) can determine that serving cell's downlink transmission burst or COT has started or ongoing and based on which it can indicate dlCOTActive to MAC entity. Also, the physical layer of the UE can determine the end of serving cell's downlink transmission burst or COT based on different methods (e.g. UE can determine end of COT based on absence of cell common signal like SSB or CSI-RS or serving cell indicates the end time of downlink transmission burst during ongoing COT using SSB or a PDCCH transmission which contains information about end time), in which case the physical layer can indicate dlCOTInactive to the MAC entity.

In an embodiment, the UE can be provided with RRC configuration (using system information or dedicated RRC signaling) in order to allow the UE to monitor for base station transmissions containing information about the acquired COT and initiate dlCOTTimer. Following information may be contained within the configuration.

In an embodiment, a search space configuration can be provided for the UE to monitor for the base station transmissions providing information about the acquired COT. The search space configuration includes time resources (e.g. time offset, periodicity and duration) for downlink signal monitoring and may contain information about DCI format or information about SSB or CSI-RS or preamble transmission to be monitored by the UE.

In another embodiment, the UE monitors the search space configured for PDCCH monitoring corresponding to a RAR or a PDSCH or a PUSCH, etc. Within the search space, the UE can be configured to monitor a separate DCI format or a SSB or a CSI-RS resource or preamble transmission from a cell. The UE can also be configured with monitoring time occasions (e.g. time periodicity, offset, duration) used for monitoring the given base station transmissions. By decoding the given base station transmission (e.g. DCI/SSB/CSI-RS/preamble), the UE can determine information about COT acquired by the base station.

In another embodiment, separate CORESET configuration can be provided to the UE to monitor for base station transmissions providing information about the acquired COT. If no such configuration is provided then, the UE uses the CORESET configuration provided in a SIB1 associated with ControlResourceSetId=0.

In another embodiment, the UE can be configured with monitoring time configuration (which includes time periodicity, offset and duration), where the UE is expected to monitor for the base station transmissions indicating information about the acquired COT. The configuration may also contain information about the base station transmissions e.g. SSB parameters, CSI-RS resources, preamble information, etc.

Referring now to the drawings, and more particularly to FIGS. 1A through 4, where similar reference characters denote corresponding features consistently throughout the figures, there are shown preferred embodiments.

FIG. 1A is an overview of a wireless communication system (300) for handling a timer operation, according to the embodiments as disclosed herein. In an embodiment, the wireless communication system (300) includes a UE (100) and a base station (200). The UE (100) can be, for example but not limited to a cellular phone, a tablet, a smart phone, a laptop, a Personal Digital Assistant (PDA), a global positioning system, a multimedia device, a video device, an internet of things (IoT) device, a smart watch, a game console, an Unmanned Aerial Vehicle (UAV), an airplane, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB or the like.

In an embodiment, the UE (100) includes a processor (110), a communicator (120), a memory (130), a MAC Timer (140) and a COT Timer (150). The processor (110) is coupled with the communicator (120), the memory (130), the MAC Timer (140) and the COT Timer (150).

In an embodiment, the processor (110) is configured to receive a signaling message from a base station (200). The signaling message includes an information about acquired COT of the base station (200). Further, the processor (110) is configured to indicate about the acquired COT to a MAC layer from a physical layer. The physical layer indicates that the base station (200) acquires the COT for transmission or the base station (200) has missed a transmission opportunity due to a LBT failure.

In an embodiment, the signaling information includes at least one of a layer-1 message, a MAC CE message, and a RRC message. In an embodiment, the information about the acquired COT of the base station (200) is indicated based on at least one of a search space configuration, a CORESET configuration, and a monitoring time configuration.

In an embodiment, at least one of the search space configuration, the CORESET configuration, and the monitoring time configuration is provided for the UE (100) to monitor for base station transmissions providing information about the acquired COT.

In an embodiment, the search space configuration includes at least one of a time resource for a downlink signal monitoring, an information about at least one of DCI format, a SSB, a CSI-RS, and a preamble transmission to be monitored by the UE (100).

In an embodiment, the search space configuration is provided for a PDCCH monitoring corresponding to at least one of a RAR, a PDSCH and a PUSCH.

In an embodiment, the monitoring time configuration includes at least one of a SSB parameter, CSI-RS, and preamble information.

Further, the processor (110) is configured to detect that an event to start a COT timer (150) is satisfied and start the COT timer (150) instead of the MAC timer (140) in response to the event to start the COT timer is satisfied. Further, the processor (110) is configured to receive a COT active indication indicating that the base station (200) acquires the COT for transmission. Further, the processor (110) is configured to stop the COT timer (150) and start the MAC timer (140) based on the COT active indication.

Further, the processor (110) is configured to stop or pause the MAC timer (140) and start the COT timer (150), when the UE (100) receives a COT inactive indication indicating that the base station (200) has missed a transmission opportunity due to a LBT failure. Further, the processor (110) is configured to receive another COT active indication indicating that the base station (200) acquires the COT for transmission. Further, the processor (110) is configured to stop the COT timer (150) and resume the MAC timer (140) based on the COT active indication.

In an embodiment, the event corresponds to one of receiving a Synchronization Signal Block (SSB) transmission information, a SSB transmission information from the base station (200) corresponding to a SSB index associated with a transmitted Physical Random Access Channel (PRACH), a Channel State Information Reference Signal (CSI-RS) transmission from the base station (200) corresponding to a serving cell, a CSI-RS transmission from the base station (200) corresponding to the CSI-RS index of the serving cell associated with a transmitted PRACH, a Physical Downlink Control Channel (PDCCH) identified by a cell common Radio Network Temporary Identifier (RNTI) value, a preamble transmission from the base station (200) indicating one of a start COT, an end COT, and an ongoing COT for the serving cell of the base station (200), and base station transmission according to the monitoring criteria defined for the MAC timer.

In an embodiment, the COT timer (150) is configured based on at least one of a serving cell, a MAC entity, a per bandwidth part, a predefined value received from at least one a Discontinuous Reception (DRX) timer, a random access procedure, a buffer status reporting procedure, a power headroom reporting procedure, and a scheduling request procedure.

In an embodiment, the configuration of the COT timer (150) is modified through one of a RRC signalling message, a MAC CE based signalling message, an a DCI based signalling message.

In an embodiment, the UE (100) initiates the COT timer (150) to monitor the signaling information from the base station (200), when at least one the UE (100) is provided with a RRC configuration for monitoring for network transmissions containing information about the COT, the UE (100) is monitoring for a RAR in an unlicensed carrier, the UE (100) has performed PRACH transmission on an unlicensed carrier, a MAC entity instructs a physical layer to perform a PRACH transmission, the physical layer indicates a start of PRACH transmission to the MAC layer, the physical layer indicates an end of scheduling request transmission to the MAC layer, the UE (100) is monitoring for a RRC connection response on an unlicensed carrier, the UE (100) has performed a RRC connection request transmission on an unlicensed carrier, the UE (100) is monitoring for a PDCCH or a PDSCH transmission on the unlicensed carrier, and the UE (100) has performed scheduling request (SR) transmission on the unlicensed carrier.

In an embodiment, the UE (100) stops the COT timer (150), when one the UE (100) monitors the PDCCH for downlink assignment if a response window is running, the UE (100) monitors for PDCCH identified by a RA-RNTI or C-RNTI in case of beam failure recovery request, if the response window is running, the UE (100) monitors for both PDCCH identified by the RA-RNTI or the C-RNTI in case of beam failure recovery request and network indication containing information about the COT, on successful reception of a RAR addressed to the UE (100), the UE (100) initiates RAR-LBT-FAILURE procedure, the UE (100) performs Random Access Response Failure procedure, the UE (100) performs SR-LBT-FAILURE procedure, a periodic BSR is triggered, and the UE (100) perform a PERIODIC-BSR-LBT-FAILURE procedure.

The processor (110) is configured to execute instructions stored in the memory (130) and to perform various processes. The communicator (120) is configured for communicating internally between internal hardware components and with external devices via one or more networks.

The memory (130) stores instructions to be executed by the processor 140. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

In an embodiment, the base station (200) includes a processor (210), a communicator (220), and a memory (230). The processor (210) is coupled with the memory (230) and the communicator (220). The processor (210) is configured to determine whether the COT is started or ongoing. The processor (210) is configured to send the COT active indication to the UE (100) indicating that the base station (200) has acquired the COT for transmission in response to determine that the COT is started or ongoing, and send the COT inactive indication to the UE (100) indicating that the base station has missed the transmission opportunity due to a LBT failure in response to determine that the COT is not started or ongoing In an embodiment, the COT inactive indication is send to the UE (100), when the base station (200) acquires a channel using a short LBT, but the base station (200) is unsuccessful to acquire the channel using a long LBT.

The processor (210) is configured to execute instructions stored in the memory (230) and to perform various processes. The communicator (220) is configured for communicating internally between internal hardware components and with external devices via one or more networks.

The memory (230) stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In some examples, the memory (230) can be configured to store larger amounts of information than the memory. In certain examples, a non-transitory storage medium may store data that can, over time, change (e.g., in Random Access Memory (RAM) or cache).

Although the FIG. 1A shows various hardware components of the wireless communication system (300) but it is to be understood that other embodiments are not limited thereon. In other embodiments, the wireless communication system (300) may include less or more number of components. Further, the labels or names of the components are used only for illustrative purpose and does not limit the scope of the invention. One or more components can be combined together to perform same or substantially similar function to handle the timer operation in the wireless communication system (300).

FIG. 1B is a block diagram of a processor (110) included in the UE (100), according to the embodiments as disclosed herein. In an embodiment, the processor (110) includes a COT determiner (110a), a timer operation indicator (110b), an event detector (110c), a COT timer handler (110d) and a MAC timer handler (110e).

In an embodiment, the COT determiner (110a) is configured to receive the signaling message from the base station (200), where the signaling message includes an information about acquired COT of the base station (200). Further, the timer operation indicator (110b) is configured to indicate about the timer operation to the MAC layer from the physical layer. The physical layer indicates that the base station (200) acquires the COT for transmission or the base station (200) has missed a transmission opportunity due to a LBT failure.

Further, the event detector (110c) is configured to detect that the event to start the MAC timer (140) is satisfied. The COT timer handler (110d) is configured to start the COT timer (150) instead of the MAC timer (140) in response to the event to start the COT timer is satisfied. Further, the processor (110) is configured to receive a COT active indication indicating that the base station (200) acquires the COT for transmission. Further, the COT timer handler (110d) is configured to stop the COT timer (150). The MAC timer handler (110e) is configured to start the MAC timer (140) based on the COT active indication.

Further, the MAC timer handler (110e) is configured to stop or pause the MAC timer (140) and start the COT timer (150) using the COT timer handler (110d), when the UE (100) receives the COT inactive indication indicating that the base station (200) has missed a transmission opportunity due to a LBT failure. Further, the COT timer handler (110d) is configured to receive another COT active indication indicating that the base station (200) acquires the COT for transmission. Further, the COT timer handler (110d) is configured to stop the COT timer (150) and resume the MAC timer (140), using the MAC timer handler (110e), based on the COT active indication.

Although the FIG. 1B shows various hardware components of the processor (110) but it is to be understood that other embodiments are not limited thereon. In other embodiments, the processor (110) may include less or more number of components. Further, the labels or names of the components are used only for illustrative purpose and does not limit the scope of the invention. One or more components can be combined together to perform same or substantially similar function to handle the timer operation in the wireless communication system (300).

FIG. 1C is a block diagram of a processor (210) included in the base station (200), according to the embodiments as disclosed herein. In an embodiment, the processor (210) includes a COT determiner (210a) and a timer operation indicator (210b).

The COT determiner (210a) is configured to determine whether the COT is started or ongoing. The timer operation indicator (210b) is configured to send the COT active indication to the UE (100) indicating that the base station (200) has acquired the COT for transmission in response to determine that the COT is started or ongoing, and send the COT inactive indication to the UE (100) indicating that the base station has missed a transmission opportunity due to a LBT failure in response to determine that the COT is not started or ongoing.

Although the FIG. 1C shows various hardware components of the processor (210) but it is to be understood that other embodiments are not limited thereon. In other embodiments, the processor (210) may include less or more number of components. Further, the labels or names of the components are used only for illustrative purpose and does not limit the scope of the invention. One or more components can be combined together to perform same or substantially similar function to handle the timer operation in the wireless communication system (300).

FIG. 2A is a schematic diagram illustrating a timer handling in a non-adaptive procedure, according to the embodiments as disclosed herein Three solutions are proposed where each to adapt the existing operation of MAC timers (140) for NR Unlicensed operation where the UE (100) or the base station transmission (e.g. PDCCH) can be missed/delayed due to LBT failures. One or more of MAC timers (140) can be considered for this procedure includes ra-ResponseWindow, bfr-ResponseWindow, ra-ContentionResolutionTimer, drx-onDurationTimer, drx-InactivityTimer drx-RetransmissionTimerDL, drx-RetransmissionTimerUL, drx-ShortCycleTimer, drx-HARQ-RTT-TimerDL, drx-HARQ-RTT-TimerUL, periodicBSR-Timer, retxBSR-Timer, sr-ProhibitTimer, phr-PeriodicTimer, and phr-ProhibitTimer.

In an embodiment, a radio signalling between the UE (100) and the base station (200), lower layers (e.g. physical layers) of the UE (100) provide one of the two indications to UE's MAC Layer: (a) dlCOTActive—the base station (200) is able to acquire the COT for transmission, (b) dlCOTInactive—the base station (200) has missed a transmission opportunity due to LBT failures.

The base station (200) can transmit a Layer-1 (L1) message or Medium Access Control-Control Element (MAC CE) or Radio Resource Control (RRC) message which contains indication about acquired COT of the base station (200). In an example, UE's physical layer after receiving a downlink transmission from a serving cell (e.g. SSB or Channel State Indicator-Reference Signal (CSI-RS) or a PDCCH identified by a common cell identity or a downlink preamble) can determine that serving cell's downlink transmission burst or COT has started or ongoing and based on which the physical layer of the UE (100) can indicate the dlCOTActive to the MAC entity. Also, the physical layer can determine the end of serving cell's downlink transmission burst or COT based on different methods (e.g. the UE (100) can determine end of COT based on absence of cell common signal like SSB or CSI-RS or serving cell indicates the end time of downlink transmission burst during ongoing COT using a SSB or a PDCCH transmission which contains information about end time), in which case the physical layer can indicate dlCOTInactive to the MAC entity. The UE (100) can be provided with a RRC configuration (using system information or dedicated RRC signaling) in order to allow the UE (100) to monitor for base station transmissions containing information about the acquired COT and initiate dlCOTTimer. Following information may be contained within the configuration:

(1): In an embodiment, the search space configuration can be provided for the UE (100) to monitor for base station transmissions providing information about the acquired COT. The search space configuration includes time resources (e.g. time offset, periodicity and duration) for downlink signal monitoring and may contain information about the DCI format or information about SSB or CSI-RS or preamble transmission to be monitored by the UE (100).

(2): In another embodiment, the UE (100) monitors search space configured for the PDCCH monitoring corresponding to the RAR or the PDSCH or the PUSCH, etc. Within the search space, the UE (100) can be configured to monitor the separate DCI format or the SSB or the CSI-RS resource or preamble transmission from the cell. The UE (100) can also be configured with monitoring time occasions (e.g. time periodicity, offset, duration) used for monitoring the given base station transmissions. By decoding the given base station transmission (e.g. DCI/SSB/CSI-RS/preamble), the UE (100) can determine information about COT acquired by the base station (200).

(3): In another embodiment, the separate CORESET configuration can be provided to the UE (100) to monitor for base station transmissions providing information about the acquired COT. If no such configuration is provided then, UE uses the CORESET configuration provided in the SIB1 associated with ControlResourceSetId=0.

(4): In another embodiment, the UE (100) can be configured with monitoring time configuration (which includes time periodicity, offset and duration), where the UE (100) is expected to monitor for base station transmissions indicating information about the acquired COT. The configuration may also contain information about the base station transmissions e.g. SSB parameters, CSI-RS resources, preamble information, etc.

Based on this, two solutions are provided that can be applied possible to any timer/monitoring window with minor modifications to triggering condition.

dlCOTTimer Operation:

Non-Adaptive Approach: In one embodiment, for any timer/monitoring window, let's say timer T, the proposed method introduces a new timer called dlCOTTimer. The dlCOTTimer can be the COT timer (150). The terms "dlCOTTimer" and "COT timer (150)" are used interchangeably in the disclosure.

(1): Duration of dlCOTTimer in terms of slots or symbols or absolute time units (e.g. in units of ms). The UE (100) can be configured with different values of dlCOTTimer for different use cases, for e.g. the UE (100) can be configured with different dlCOTTimer values for different timers T.

(2): The UE (100) starts dlCOTTimer based on triggering criteria defined for each timer and is discussed further in the disclosure.

(3): While the dlCOTTimer is running, the UE (100) shall monitor the downlink channel based on one or more of below options:

(a): When the dlCOTTimer is running, the UE (100) monitors for SSB transmission from the base station (200).

(b): When the dlCOTTimer is running, the UE (100) monitors for the SSB transmission from the base station (200) corresponding to the SSB index associated with the transmitted PRACH.

(c): When the dlCOTTimer is running, the UE (100) monitors for any CSI-RS transmission from the base station (200) corresponding to the serving cell (if CSI-RS resources are configured to the UE (100) for the serving cell).

(d): When the dlCOTTimer is running, the UE (100) monitors for CSI-RS transmission from the base station (200) corresponding to the CSI-RS index of the serving cell associated with the transmitted PRACH (if CSI-RS resources are configured to the UE (100) for the serving cell).

(e): The UE (100) monitors for a PDCCH identified by a cell common RNTI value (i.e. a predefined RNTI value or RNTI value configured by the base station (200) e.g. in system information or dedicated configuration).

(f): The UE (100) monitors for a preamble/any transmission from the base station (200) indicating start/end/ongoing COT for the given serving cell of the base station.

(g): The UE (100) monitors for a base station transmission according to the monitoring criteria defined for timer T. For e.g. the UE (100) monitors for a PDCCH identified by RA-RNTI corresponding to the PRACH transmitted by the UE (100) or C-RNTI in case of beam failure recovery request, the UE (100) monitors for a PDCCH identified by the C-RNTI for the case when the dlCOTTimer is initiated for DRX timer, or when dlCOTTimer is initiated in response to scheduling request transmission, etc.

(4): On reception of dlCOTActive indication, the UE (100) stops dlCOTTimer and starts T after L2 duration. L2 can be different for different MAC timers. Value of L2 can be configurable via RRC configuration/MAC CE/DCI or can have a pre-defined value as well.

(5): One instance of dlCOTTimer can be shared by multiple timers T. For example, if dlCOTTimer is already running for a timer T1 (e.g. drx-InactivityTimer), then the UE (100) does not need to initiate another instance of dlCOTTimer in order to trigger timer T2 (e.g. drx-RetransmissionTimerUL).

FIG. 2B is a schematic diagram illustrating a timer handling in an adaptive procedure, according to the embodiments as disclosed herein.

Adaptive Approach: In one embodiment, for any timer/monitoring window, let's say T, the proposed method introduces a new timer called dlCOTTimer.

(1): Duration of dlCOTTimer in terms of slots or symbols or absolute time units (e.g. in units of ms). The UE (100) can be configured with different values of the dlCOTTimer for different use cases, for e.g. the UE (100) can be configured with different dlCOTTimer values for different timers T.

(2): The UE (100) starts dlCOTTimer based on triggering criteria defined for each timer and is discussed in the patent disclosure.

(3): While the dlCOTTimer is running, the UE (100) shall monitor the downlink channel based on one or more of below options:

(a): When the dlCOTTimer is running, the UE (100) monitors for SSB transmission from the base station (200).

(b): When the dlCOTTimer is running, the UE (100) monitors for SSB transmission from the base station (200) corresponding to the SSB index associated with the transmitted PRACH.

(c): When dlCOTTimer is running, the UE (100) monitors for any CSI-RS transmission from the base station (200) corresponding to the serving cell (if the CSI-RS resources are configured to the UE (100) for the serving cell).

(d): When the dlCOTTimer is running, the UE (100) monitors for CSI-RS transmission from the base station (200) corresponding to the CSI-RS index of the serving cell associated with the transmitted PRACH (if CSI-RS resources are configured to the UE (100) for the serving cell).

(e): The UE (100) monitors for a PDCCH identified by a cell common RNTI value (i.e. a predefined RNTI value or RNTI value configured by the base station (200) e.g. in system information or dedicated configuration).

(f): The UE (100) monitors for a preamble/any transmission from the base station (200) indicating start/end/ongoing COT for the given serving cell of the base station (200).

(g): The UE (100) monitors for the base station transmission based on the monitoring criteria defined for timer T. For e.g. the UE (100) monitors for the PDCCH identified by RA-RNTI corresponding to the PRACH transmitted by the UE (100) or C-RNTI in case of beam failure recovery request, the UE (100) monitors for the PDCCH identified by C-RNTI for the case when dlCOTTimer is initiated for DRX timer, or when dlCOTTimer is initiated in response to scheduling request transmission, etc.

(4): On reception of dlCOTActive indication, if T has not been started even once, the UE (100) stops dlCOTTimer and starts T after L2 duration. L2 can be different for different timers. L2 can be configurable via the RRC configuration/MAC CE/DCI or can have a static configuration as well.

(5): On reception of dlCOTActive indication, if T has been paused/suspended—

(a): If the dlCOTTimer is running, the UE (100) shall:

(i): pause/suspend dlCOTTimer and resume T after L3 duration.

(ii): stop dlCOTTimer and resume T after L3 duration.

(iii): L3 can be different for different timers. L3 can be configurable via RRC configuration/MAC CE/DCI or can have a static configuration as well.

(6): On reception of dlCOTInactive indication—

(a): If T is running, the UE (100) shall—

(i): Pause/suspend T and resume dlCOTTimer after L4 duration.

(ii): Pause/suspend T and restart dlCOTTimer after L4 duration.

(iii): L4 can be different for different timers. L4 can be configurable via RRC configuration/MAC CE/DCI or can have a static configuration as well.

(7): One instance of the dlCOTTimer can be shared by multiple timers T. For example, if the dlCOTTimer is already running for a timer T1 (e.g. drx-InactivityTimer), then the UE (100) does not need to initiate another instance of the dlCOTTimer in order to trigger timer T2 (e.g., drx-RetransmissionTimerUL)

Configuration of dlCOTTimer: For any timer/monitoring window T, the associated dlCOTTimer, as mentioned above in Adaptive/Non-Adaptive Approach, can be configured in following manner.

(a): In one embodiment, the dlCOTTimer is provided in common configuration which is applicable to one or more timers T. For e.g. the RRC configuration for the dlCOTTimer is provided per serving cell or per MAC entity or per bandwidth part configured for a cell. The UE (100) applies same value of dlCOTTimer for all the MAC timers which are operating within the given serving cell or MAC entity or bandwidth part, respectively.

(b): In another embodiment, configuration of dlCOTTimer is provided for each timer T.

(i): Independent configuration for dlCOTTimer can be provided for each configuration of following timers: ra-ResponseWindow, bfr-ResponseWindow, ra-ContentionResolutionTimer, drx-onDurationTimer, drx-InactivityTimer, drx-RetransmissionTimerDL, drx-RetransmissionTimerUL, drx-ShortCycleTimer, drx-HARQ-RTT-TimerDL, drx-HARQ-RTT-TimerUL, periodicBSR-Timer, retxBSR-Timer, sr-ProhibitTimer, phr-PeriodicTimer, and phr-ProhibitTimer.

(ii): Independent configuration for dlCOTTimer can be provided for each of configuration of following procedures:

(1): All DRX timers share the same value of dlCOTTimer.

(2): All timers related to random access procedure share same value of the dlCOTTimer.

(3): All timers related to a buffer status reporting procedure share same value of dlCOTTimer.

(4): All timers related to power headroom reporting procedure share same value of the dlCOTTimer.

(5): All timers related to scheduling request procedure share same value of the dlCOTTimer.

(c): In another embodiment, the UE shall use value of dlCOTTimer provided in common configuration if configuration of dlCOTTimer is not provided for a specific timer T.

(2): In another embodiment, the configurations corresponding to various dlCOTTimer can be modified via RRC signaling/MAC CE based signaling/DCI based signaling.

Random Access Response Timer Operation:

(1): The UE (100) can initiate the dlCOTTimer for RAR reception if one or more of below conditions are true:

(a): the UE (100) is provided with RRC configuration for monitoring for base station transmissions containing information about the acquired COT and configuration of the dlCOTTimer.

(b): the UE (100) is monitoring for the RAR in an unlicensed carrier.

(c): the UE (100) has performed PRACH transmission on an unlicensed carrier (2): The UE (100) starts the dlCOTTimer corresponding to random access response timer according to the configuration provided for RAR reception at one of the following instances:

(a): the UE (100) starts dlCOTTimer after the MAC entity instructs the physical layer to perform the PRACH transmission.

(b): The UE (100) starts dlCOTTimer X time units after the physical layer starts transmission on the first PRACH occasion (e.g. in case of multiple PRACH transmission occasions). The physical layer may indicate the start of PRACH transmission to the MAC layer. Value of X can be configured by the base station (200) (e.g. using system information or dedicated configuration) or can be a predefined value (e.g. value of X can be 0).

(c): The UE (100) starts dlCOTTimer X time units after the end of PRACH transmission performed by the physical layer (e.g. in case of multiple PRACH transmission occasions, end of PRACH transmission corresponds to the last PRACH transmission occasion). The physical layer may indicate the end of PRACH transmission to the MAC layer. Value of X can be configured by the base station (200) (e.g. using system information or dedicated configuration) or can be a predefined value (e.g. value of X can be 0).

(3): The UE (100) suspends/stops/resumes/starts dlCOTTimer and ra-ResponseWindow according to procedure mentioned in "Non-Adaptive Approach" or "Adaptive Approach"

(4): The UE (100) shall monitor the PDCCH for downlink assignment when ra-ResponseWindow is running:

(a): In an embodiment, the UE (100) monitors for only PDCCH identified by the RA-RNTI or the C-RNTI in case of beam failure recovery request, when ra-ResponseWindow is running.

(b): In another embodiment, the UE (100) monitors for both PDCCH identified by the RA-RNTI or the C-RNTI in case of beam failure recovery request and base station indication containing information about the COT (according to the configuration indicated in point 1)

(5): On successful reception of a RAR addressed to the UE (100), the UE shall stop dlCOTTimer (if running) and ra-ResponseWindow (6): On expiry of dlCOTTimer the UE (100) initiates RAR-LBT-FAILURE procedure:

(7): On ra-ResponseWindow expiry, the UE (100) shall perform procedure as on Random Access Response Failure.

Contention Resolution Timer Operation:

(1): The UE (100) can initiate dlCOTTimer for Message-4 reception if one or more of below conditions are true:

(a): The UE (100) is provided with the RRC configuration for monitoring for the base station transmissions containing information about the acquired COT and configuration of dlCOTTimer.

(b): the UE (100) is monitoring for Message-4 on an unlicensed carrier.

(c): the UE (100) has performed the PRACH transmission on the unlicensed carrier.

(d): the UE (100) has performed Message-3 transmission on the unlicensed carrier.

(2): The UE (100) starts dlCOTTimer corresponding to contention resolution timer according to the configuration provided at one of the following instances:

(a): the UE (100) starts the dlCOTTimer after MAC entity instructs physical layer to perform Message-3 transmission.

(b): the UE (100) starts dlCOTTimer X time units after physical layer starts transmission on the first symbol/slot of Message-3 (or Message-4) (e.g. in case of uplink grant for Message-3 may contains multiple symbols/slots). The physical layer may indicate the start of Message-3 transmission to the MAC layer. The value of X can be indicated by the base station (200) (e.g. using system information or dedicated configuration or DCI or MAC CE) or can be a predefined value (e.g. value of X can be 0).

(c): the UE (100) starts dlCOTTimer X time units after the end of Message-3 transmission performed by the physical layer (e.g. in case of message-3 grant includes multiple symbols/slots, end of the message-3 transmission corresponds to the last symbol/slot of the message-3 transmission). The physical layer may indicate the end of the message-3 transmission to the MAC layer. Value of X can be indicated by the base station (200) (e.g. using system information or dedicated configuration or DCI or MAC CE) or can be a predefined value (e.g. value of X can be 0).

(3): the UE (100) suspends/stops/resumes/starts dlCOTTimer and ra-ContentionResolutionTimer according to procedure mentioned in "Non-Adaptive Approach" or "Adaptive Approach"

(4): The UE (100) shall monitor the PDCCH for downlink assignment when ra-ContentionResolutionTimer is running:

(a): In an embodiment, the UE (100) monitors for only PDCCH identified by the TC-RNTI or C-RNTI in case C-RNTI MAC CE was included within Message-3, when ra-ContentionResolutionTimer is running.

(b): In another embodiment, the UE (100) monitors for both PDCCH identified by the TC-RNTI or the C-RNTI in case C-RNTI MAC CE was included within Message-3 and base station indication containing information about the COT.

(5): On successful reception of Message-4 transmission addressed to the UE (100), the UE (100) shall stop dlCOTTimer (if running) and ra-ContentionResolutionTimer.

(6): On expiry of dlCOTTimer, the UE (100) initiates CR-LBT-FAILURE procedure (7): On ra-ContentionResolutionTimer expiry, the UE (100) shall perform procedure as on Contention Resolution Failure.

(8): If ra-ContentionResolutionTimer is running and the UE (100) receives dlCOTInactive indication, then the UE (100) stops ra-ContentionResolutionTimer sr-Prohibit Timer Operation:

(1): the UE (100) can initiate dlCOTTimer if one or more of below conditions are true:

(a): the UE (100) is provided with RRC configuration for monitoring for base station transmissions containing information about the acquired COT and configuration of dlCOTTimer (b): the UE (100) is monitoring for the PDCCH or the PDSCH transmission on the unlicensed carrier (c): the UE (100) has performed scheduling request (SR) transmission on the unlicensed carrier (2): UE (100) starts dlCOTTimer corresponding to sr-ProhibitTimer according to the configuration provided at one of the following instances:

(a): the UE (100) starts dlCOTTimer after the MAC entity instructs the physical layer to perform scheduling request transmission.

(b): the UE (100) starts dlCOTTimer X time units after physical layer starts transmission on the first scheduling request occasion (e.g. in case of multiple scheduling request transmission occasions). The physical layer may indicate the start of scheduling request transmission to the MAC layer. Value of X can be configured by the base station (200) (e.g. using system information or dedicated configuration) or can be a predefined value (e.g. value of X can be 0).

(c): the UE (100) starts dlCOTTimer X time units after the end of scheduling request transmission performed by the physical layer (e.g. in case of multiple scheduling request transmission occasions, end of scheduling request transmission corresponds to the last scheduling request transmission occasion). The physical layer may indicate the end of scheduling request transmission to the MAC layer. Value of X can be configured by the base station (200) (e.g. using system information or dedicated configuration) or can be a predefined value (e.g. value of X can be 0).

(3): The UE (100) suspends/stops/resumes/starts dlCOTTimer and sr-ProhibitTimer according to procedure mentioned in "Non-Adaptive Approach" or "Adaptive Approach"

(4): On the dlCOTTimer expiry, the UE (100) shall perform SR-LBT-FAILURE procedure.

(5): The UE (100) shall not perform transmission of a scheduling request while the dlCOTTimer is running.

periodicBSR-Timer Operation:

(1): If the Buffer Status reporting procedure determines that at least one BSR has been triggered and not cancelled and if UL-SCH resources are available for a new immediate transmission then, the UE (100) shall start dlCOTTimer corresponding to periodicBSR-Timer.

(2): The UE (100) suspends/stops/resumes/starts the dlCOTTimer and periodicBSR-Timer according to procedure mentioned in "Non-Adaptive Approach" or "Adaptive Approach"

(3): On periodicBSR-Timer expiry a periodic BSR shall be triggered.

(4): On the dlCOTTimer expiry, the UE (100) shall perform PERIODIC-BSR-LBT-FAILURE procedure.

retxBSR-Timer Operation:

(1): If the buffer status reporting procedure determines that at least one BSR has been triggered and not cancelled and if UL-SCH resources are available for a new immediate transmission, or upon reception of a grant for transmission of new data on any UL-SCH, the UE (100) shall start the dlCOTTimer corresponding to retxBSR-Timer.

(2): the UE (100) suspends/stops/resumes/starts the dlCOTTimer and the retxBSR-Timer according to procedure mentioned in "Non-Adaptive Approach" or "Adaptive Approach (3): On retxBSR-Timer expiry a regular BSR shall be triggered.

(4): On the dlCOTTimer expiry, the UE (100) shall perform RETX-BSR-LBT-FAILURE procedure.

drx-onDurationTimer Operation:

(1): The UE (100) can initiate the dlCOTTimer for drx-onDurationTimer operation if one or more of below conditions are true:

(a): the UE (100) is provided with the RRC configuration for monitoring for base station transmissions containing information about the acquired COT and configuration of the dlCOTTimer.

(b): the UE (100) is monitoring for the PDCCH on the unlicensed carrier.

(2): The UE (100) starts the dlCOTTimer corresponding to drx-onDurationTimer according to the configuration provided at one or more of the following instances:

(a): The UE (100) starts the dlCOTTimer X time units after SFN and subframe where (i): If the Short DRX Cycle is used, and [(SFN×10)+subframe number] modulo (drx-ShortCycle)=(drx-StartOffset) modulo (drx-ShortCycle) or (ii): If the Long DRX Cycle is used, and [(SFN×10)+subframe number] modulo (drx-LongCycle)=drx-StartOffset.

(iii): Value of X can be indicated by the base station (200) (e.g. using system information or dedicated configuration or the DCI or the MAC CE) or can be a predefined value (e.g. value of X can be 0).

(b): The UE (100) starts the dlCOTTimer X time units after start of a pre-configured time window, where the time window configuration includes at least time offset of start occasion of time window, time periodicity of time window. For instance, the time window can be discrete monitoring timing configuration provided to the UE (100), or the time window can be any configuration provided to the UE (100) using dedicated configuration. The value of X can be indicated by the base station (200) (e.g. using system information or dedicated configuration or DCI or MAC CE) or can be a predefined value (e.g. value of X can be 0).

(3): The UE (100) suspends/stops/resumes/starts the dlCOTTimer and drx-onDurationTimer according to procedure mentioned in "Non-Adaptive Approach" or "Adaptive Approach"

(4): The UE (100) shall monitor the PDCCH for downlink assignment when the drx-OnDurationTimer is running:

(a): In an embodiment, the UE (10) monitors for only PDCCH identified by the C-RNTI.

(b): In another embodiment, the UE (100) monitors for both PDCCH identified by the C-RNTI and base station indication containing information about COT.

(5): On successful reception of a DRX command MAC CE or a Long DRX Command MAC CE, the UE (100) shall stop dlCOTTimer (if running) and drx-OnDurationTimer.

(6): On expiry of dlCOTTimer, the UE (100) initiates ON-DRX-LBT-FAILURE procedure.

(7): On expiry or stoppage of drx-onDurationTimer, the UE (100) stops the dlCOTTimer if running (8): If drx-OnDurationTimer is running and the UE (100) receives dlCOTInactive indication, then the UE (100) stops drx-OnDurationTimer.

drx-InactivityTimer Operation:

(1): The UE (100) can initiate dlCOTTimer for drx-InactivityTimer operation if one or more of below conditions are true:

(a): The UE (100) is provided with the RRC configuration for monitoring for base station transmissions containing information about the acquired COT and configuration of dlCOTTimer.

(b): The UE (100) is monitoring for PDCCH on the unlicensed carrier (2): The UE (100) starts dlCOTTimer X time units after the UE (100) receives a PDCCH indicating a new transmission (DL or UL). The value of X can be configured by the base station (200) (e.g. using system information or dedicated configuration) or can be a predefined value (e.g. value of X can be 0).

(3): The UE (100) suspends/stops/resumes/starts dlCOTTimer and drx-InactivityTimer according to procedure mentioned in "Non-Adaptive Approach" or "Adaptive Approach"

(4): The UE (100) shall monitor the PDCCH for downlink assignment when drx-InactivityTimer is running:

(a): In an embodiment, the UE (100) monitors for only PDCCH identified by the C-RNTI.

(b): In another embodiment, the UE (100) monitors for both PDCCH identified by the C-RNTI and base station indication containing information about the COT.

(5): On successful reception of the DRX command MAC CE or a Long DRX Command MAC CE, the UE (100) shall stop dlCOTTimer (if running) and drx-InactivityTimer.

(6): On expiry of the dlCOTTimer, the UE (100) initiates IN-DRX-LBT-FAILURE procedure.

(7): On expiry or stoppage of drx-InactivityTimer, the UE (100) stops the dlCOTTimer if running (8): If drx-InactivityTimer is running and the UE (100) receives the dlCOTInactive indication, then the UE (100) stops drx-InactivityTimer.

drx-RetransmissionTimerUL Operation:

(1): The UE (100) can initiate dlCOTTimer for drx-RetransmissionTimerUL operation if one or more of below conditions are true:

(a): The UE (100) is provided with the RRC configuration for monitoring for base station transmissions containing information about the acquired COT and configuration of dlCOTTimer.

(b): The UE (100) is monitoring for PDCCH on the unlicensed carrier.

(2): The UE (100) starts dlCOTTimer X time units after drx-HARQ-RTT-TimerUL expires. The value of X can be configured by the base station (200) (e.g. using system information or dedicated configuration) or can be a predefined value (e.g. value of X can be 0).

(3): The UE (100) suspends/stops/resumes/starts the dlCOTTimer and drx-RetransmissionTimerUL according to procedure mentioned in "Non-Adaptive Approach" or "Adaptive Approach"

(4): The UE (100) shall monitor the PDCCH for downlink assignment when the drx-RetransmissionTimerUL is running:

(a): In an embodiment, the UE (100) monitors for only PDCCH identified by the C-RNTI.

(b): In another embodiment, the UE (100) monitors for both PDCCH identified by the C-RNTI and the base station indication containing information about the COT.

(5): On successful reception of the PDCCH indicating the UL transmission or if the MAC PDU is transmitted in a configured uplink grant, the UE (100) shall stop the dlCOTTimer (if running) and drx-RetransmissionTimerUL for the HARQ process corresponding to the UL transmission.

(6): On expiry of the dlCOTTimer, the UE (100) initiates RETU-DRX-LBT-FAILURE procedure.

(7): On expiry or stoppage of drx-RetransmissionTimerUL, the UE (100) stops dlCOTTimer if running for the corresponding HARQ process.

(8): If drx-RetransmissionTimerUL is running and the UE (100) receives dlCOTInactive indication, then the UE (100) stops drx-RetransmissionTimerUL for the corresponding HARQ process.

drx-RetransmissionTimerDL Operation:

(1): The UE (100) can initiate dlCOTTimer for drx-RetransmissionTimerDL operation if one or more of below conditions are true:

(a): The UE (100) is provided with the RRC configuration for monitoring for base station transmissions containing information about the acquired COT and configuration of dlCOTTimer.

(b): The UE (100) is monitoring for the PDCCH on the unlicensed carrier.

(2): The UE (100) starts dlCOTTimer X time units after drx-HARQ-RTT-TimerDL expires and if the data of the corresponding HARQ process was not successfully decoded. The value of X can be configured by the base station (200) (e.g. using system information or dedicated configuration) or can be a predefined value (e.g. value of X can be 0).

(3): The UE (100) suspends/stops/resumes/starts the dlCOTTimer and drx-RetransmissionTimerDL according to procedure mentioned in "Non-Adaptive Approach" or "Adaptive Approach"

(4): The UE (100) monitors the PDCCH for downlink assignment when drx-RetransmissionTimerDL is running:

(a): In an embodiment, the UE (100) monitors for only PDCCH identified by the C-RNTI.

(b): In another embodiment, the UE (100) monitors for both PDCCH identified by the C-RNTI and base station indication containing information about COT.

(5): On successful reception of the PDCCH indicating the DL transmission or if the DL assignment has been configured, the UE (100) shall stop dlCOTTimer (if running) and drx-RetransmissionTimerDL for the HARQ process corresponding to the DL transmission.

(6): On expiry of the dlCOTTimer, the UE (100) initiates RETD-DRX-LBT-FAILURE procedure (7): On expiry or stoppage of drx-RetransmissionTimerDL, the UE (100) stops dlCOTTimer if running for the corresponding HARQ process.

(8): If drx-RetransmissionTimerDL is running and the UE (100) receives dlCOTInactive indication then, the UE (100) stops drx-RetransmissionTimerDL for the corresponding HARQ process.

FIG. 2C is a schematic diagram illustrating a network indication based timer restart, according to the embodiments as disclosed herein Base station Indication based Timer restart:

(1): If the base station (200) is able to acquire the channel using a short LBT, but is unsuccessful to acquire the channel using a long LBT, then the base station (200) acquires the channel using the short LBT and the base station (200) transmits the indication to the UE(s) (100) indicating failure to acquire channel using the long LBT. The indication from the base station (200) can be a common broadcast signal or message which can be received by all the UEs (100) listening to the base station transmissions or can be a UE specific message which can be received by the UE(s) (100). In an embodiment, the indication can be a signal which is reserved to provide negative indication of long LBT unsuccessful e.g. SSB transmission with a predefined or configured physical cell identity or a DeModulation Reference Signal (DM-RS) signal or CSI-RS transmission. In another embodiment, the indication can be in form of explicit parameter value contained within a master information block or the system information block or common DCI.

(2): The base station (200) sends the indication mentioned above—

(a): In an embodiment, differently for every (or few) timers separately using on same or different modes on indication.

(b): In another embodiment, one indication for restart of all timers.

(c): In another embodiment, one indication to trigger restart of timers as per their configuration (e.g. Number of indications required for restart). This configuration can be static/semi-static/configurable via the RRC message/configurable via the MAC CE.

(3): For any timer/window T, on receiving the base station indication of unable to acquire channel using long LBT, the UE (100) restarts timer T (if running)

Random Access Response Timer Operation:

(1): The UE (100) starts ra-ResponseWindow according to the configuration provided for the RAR reception at one of the following instances:

(a): The UE (100) starts ra-ResponseWindow after MAC entity instructs the physical layer to perform the PRACH transmission.

(b): The UE (100) starts ra-ResponseWindow X time units after the physical layer starts transmission on the first PRACH occasion (e.g. in case of multiple PRACH transmission occasions). The physical layer may indicate the start of PRACH transmission to the MAC layer. Value of X can be configured by the base station (200) (e.g. using system information or dedicated configuration) or can be a predefined value (e.g. value of X can be 0).

(c): The UE (100) starts ra-ResponseWindow X time units after the end of PRACH transmission performed by the physical layer (e.g. in case of multiple PRACH transmission occasions, end of PRACH transmission corresponds to the last PRACH transmission occasion). The physical layer may indicate the end of PRACH transmission to the MAC layer. Value of X can be configured by the base station (200) (e.g. using system information or dedicated configuration) or can be a predefined value (e.g. value of X can be 0).

(d): The UE (100) can be configured with the RAR timing window (contains parameters time offset with respect to {SFN=0, subframe/slot=0} where timing window is started, timing window periodicity and duration of each timing window occurrence) at the beginning of which the UE (100) can initiate ra-ResponseWindow. X time units after transmission of PRACH, the UE (100) initiates ra-ResponseWindow at the first opportunity where the given RAR timing window starts. Value of X can be configured by the base station (200) (e.g. using system information or dedicated configuration) or can be a predefined value (e.g. value of X can be 0).

(2): While the ra-ResponseWindow is running, the UE (100) shall monitor the downlink channel based on one or more of below options:

(a): In an embodiment, when ra-ResponseWindow is running, the UE (100) monitors for the SSB transmission from the base station (200). In further extension, the UE (100) does not need to monitor for the SSB transmissions from the base station (200) when COT is ongoing (e.g. based on dlCOTActive and dlCOTInactive indications) for the given cell of the base station (200) where the UE (100) has performed PRACH.

(b): In another embodiment, when the ra-ResponseWindow is running, the UE (100) monitors for the SSB transmission from the base station (200) corresponding to the SSB index associated with the transmitted PRACH. In further extension, the UE (100) does not need to monitor for the SSB transmissions from the base station (200) when the COT is ongoing (e.g. based on dlCOTActive and dlCOTInactive indications) for the given cell of the base station (200) where the UE (100) has performed PRACH.

(c): In another embodiment, when ra-ResponseWindow is running, the UE (100) monitors for any CSI-RS transmission from the base station (200) corresponding to the serving cell (if CSI-RS resources are configured to the UE (100) for the serving cell). In further extension of this solution, the UE (100) does not need to monitor for CSI-RS transmissions from the base station (200) when the COT is ongoing (e.g. based on dlCOTActive and dlCOTInactive indications) for the given cell of the base station (200) where the UE (100) has performed PRACH.

(d): In another embodiment, when ra-ResponseWindow is running, the UE (100) monitors for CSI-RS transmission from the base station (200) corresponding to the CSI-RS index of the serving cell associated with the transmitted PRACH (if CSI-RS resources are configured to the UE (100) for the serving cell). In further extension of this solution, the UE (100) does not need to monitor for CSI-RS transmissions from the base station (200) when COT is ongoing (e.g. based on dlCOTActive and dlCOTInactive indications) for the given cell of the base station (200) where the UE (100) has performed PRACH.

(e): In another embodiment, the UE (100) monitors for the PDCCH identified by the cell common RNTI value (i.e. a predefined RNTI value or the RNTI value configured by the base station (200) e.g. in system information or dedicated configuration). In further extension of this solution, the UE (100) does not need to monitor for the PDCCH transmissions addressed to the cell common RNTI from the base station (200) when the COT is ongoing (e.g. based on dlCOTActive and dlCOTInactive indications) for the given cell of the base station (200) where the UE (100) has performed PRACH.

(f): In another embodiment, the UE (100) monitors for a preamble/any transmission from the base station (200) indicating start/end/ongoing COT for the given serving cell of the base station (200). In further extension of this solution, the UE (100) does not need to monitor for preamble/any transmissions from the base station (200) indicating start/end/ongoing COT, when the COT is ongoing (e.g. based on dlCOTActive and dlCOTInactive indications) for the given cell of the base station (200) where the UE (100) has performed PRACH.

(g): In another embodiment, the UE (100) monitors for a PDCCH identified by the RA-RNTI corresponding to the PRACH transmitted by the UE (100) or C-RNTI in case of beam failure recovery request.

(3): On successfully transmitting RACH preamble, the UE (100) initializes a counter RACH-LBT-FAILURE=0

(4): On receiving the base station indication of unable to acquire channel using the long LBT, the UE (100) restarts the ra-ResponseWindow (if running) and increments RACH-LBT-FAILURE by 1.

(5): If RACH-LBT-FAILURE>MAX-RACH-LBT-FAILURE (the value can be configured by RRC), then the UE (100) performs the RAR-LBT-FAILURE procedure.

(6): On successful reception of RAR addressed to the UE (100), the UE (100) shall stop ra-ResponseWindow and consider this Random Access Response reception successful.

(7): On ra-ResponseWindow expiry, the UE (100) shall perform procedure as on Random Access Response Failure.

Contention Resolution Timer Operation:

(1): The UE (100) starts ra-ContentionWindowTimer according to the configuration provided for RAR reception at one of the following instances:

(a): the UE (100) starts ra-ContentionWindowTimer after MAC entity instructs physical layer to perform the Message-3 transmission.

(b): The UE (100) starts ra-ContentionWindowTimer X time units after the physical layer starts transmission on the first symbol/slot of Message-4 (e.g. in case of uplink grant for Message-3 may contains multiple symbols/slots). The physical layer may indicate the start of Message-3 transmission to the MAC layer. Value of X can be indicated by the base station (200) (e.g. using system information or dedicated configuration or DCI or MAC CE) or can be a predefined value (e.g. value of X can be 0).

(c): The UE (100) starts ra-ContentionWindowTimer X time units after the end of Message-3 transmission performed by physical layer (e.g. in case of Message-3 grant includes multiple symbols/slots, end of Message-3 transmission corresponds to the last symbol/slot of Message-3 transmission). The physical layer may indicate the end of message-3 transmission to the MAC layer. The value of X can be indicated by the base station (200) (e.g. using system information or dedicated configuration or the DCI or the MAC CE) or can be a predefined value (e.g. value of X can be 0).

(d): The UE (100) can be configured with the CR timing window (contains parameters time offset with respect to {SFN=0, subframe/slot=0} where the timing window is started, timing window periodicity and duration of each timing window occurrence) at the beginning of which the UE (100) can initiate ra-ContentionResolutionTimer. X time units after transmission of PRACH, the UE (100) initiates ra-ContentionResolutionTimer at the first opportunity where the given RAR timing window starts. Value of X can be indicated by the base station (200) (e.g. using system information or dedicated configuration or DCI or MAC CE) or can be a predefined value (e.g. value of X can be 0).

(2): While the ra-ContentionWindowTimer is running, the UE (100) shall monitor the downlink channel based on one or more of below options:

(a): In an embodiment, when ra-ContentionWindowTimer is running, the UE (100) monitors for the SSB transmission from the base station (200). In further extension of this solution, the UE (100) does not need to monitor for SSB transmissions from the base station (200) when the COT is ongoing (e.g. based on dlCOTActive and dlCOTInactive indications) for the given cell of the base station (200) where the UE (100) has performed PRACH.

(b): In another embodiment, when ra-ContentionWindow-Timer is running, the UE (100) monitors for the SSB transmission from the base station (200) corresponding to the SSB index associated with the transmitted PRACH. In further extension of this solution, the UE (100) does not need to monitor for the SSB transmissions from the base station (200) when the COT is ongoing (e.g. based on dlCOTActive and dlCOTInactive indications) for the given cell of the base station (200) where the UE (100) has performed PRACH.

(c): In another embodiment, when ra-ContentionWindow-Timer is running, the UE (100) monitors for any CSI-RS transmission from the base station (200) corresponding to the serving cell (if CSI-RS resources are configured to the UE (100) for the serving cell). In further extension of this solution, the UE (100) does not need to monitor for CSI-RS transmissions from the base station (200) when the COT is ongoing (e.g. based on dlCOTActive and dlCOTInactive indications) for the given cell of the base station (200) where the UE (100) has performed PRACH.

(d): In another embodiment, when ra-ContentionWindow-Timer is running, the UE (100) monitors for CSI-RS transmission from the base station (200) corresponding to the CSI-RS index of the serving cell associated with the transmitted PRACH (if CSI-RS resources are configured to the UE (100) for the serving cell). In further extension of this solution, the UE (100) does not need to monitor for CSI-RS transmissions from the base station (200) when the COT is ongoing (e.g. based on dlCOTActive and dlCOTInactive indications) for the given cell of the base station (200) where the UE (100) has performed PRACH.

(e): In another embodiment, the UE (100) monitors for a PDCCH identified by a cell common RNTI value (i.e. a predefined RNTI value or RNTI value configured by the base station (200) e.g. in system information or dedicated configuration). In further extension of this solution, the UE (100) does not need to monitor for the PDCCH transmissions addressed to the cell common RNTI from the base station (200) when the COT is ongoing (e.g. based on dlCOTActive and dlCOTInactive indications) for the given cell of the base station (200) where the UE (100) has performed PRACH.

(f): In another embodiment, the UE (100) monitors for a preamble/any transmission from the base station (200) indicating start/end/ongoing COT for the given serving cell of the base station (200). In further extension of this solution, the UE (100) does not need to monitor for preamble/any transmissions from the base station (200) indicating start/end/ongoing COT, when the COT is ongoing (e.g. based on dlCOTActive and dlCOTInactive indications) for the given cell of the base station (200) where the UE (100) has performed PRACH.

(g): In another embodiment, the UE (100) monitors for PDCCH identified by TC-RNTI or C-RNTI in case C-RNTI MAC CE was included within Message-3.

(3): On successfully transmitting Message-3, the UE (100) initializes a counter RACH-LBT-FAILURE=0

(4): On receiving the base station indication of unable to acquire channel using long LBT, the UE (100) restarts the ra-ContentionResolutionWindow (if running) and increments RACH-LBT-FAILURE by 1.

(5): If RACH-LBT-FAILURE>MAX-RACH-LBT-FAILURE (the value can be configured by RRC), then the UE (100) performs the CR-LBT-FAILURE procedure.

(6): On successful reception of Message-4 transmission addressed to the UE (100), the UE (100) shall stop ra-ContentionResolutionTimer.

(7): On ra-ContentionResolutionTimer expiry, the UE (100) shall perform procedure as on Contention Resolution Failure.

sr-Prohibit Timer Operation:

(1): On receiving indication of successful transmission of SR by the lower layers, the UE (100) shall start sr-Prohibit-Timer and initialize SR-LBT-FAILURE-COUNT=0.

(2): On receiving the base station indication of unable to acquire channel, the UE (100) will restart sr-ProhibitTimer and increments SR-LBT-FAILURE-COUNT by 1.

(3): If SR-LBT-FAILURE-COUNT>SR-LBT-FAILURE-COUNT-MAX (the value can be configured by RRC), then the UE (100) performs SR-LBT-FAILURE procedure.

periodicBSR-Timer Operation:

(1): If the Buffer Status reporting procedure determines that at least one BSR has been triggered and not cancelled and if UL-SCH resources are available for a new immediate transmission then the UE (100) shall start, periodicBSR-Timer.

(2): On receiving the base station indication of unable to acquire channel, the UE (100) will restart periodicBSR-Timer and increments PERIODIC-BSR-LBT-FAILURE-COUNT by 1.

(3): If PERIODIC-BSR-LBT-FAILURE-COUNT>PERIODIC-BSR-LBT-FAILURE-COUNT-MAX (the value can be configured by RRC), then the UE (100) performs PERIODIC-BSR-LBT-FAILURE procedure.

retxBSR-Timer Operation:

(1): If the Buffer Status reporting procedure determines that at least one BSR has been triggered and not cancelled and if UL-SCH resources are available for a new immediate transmission, or upon reception of a grant for transmission of new data on any UL-SCH, the UE (100) shall start, retxBSR.

(2): On receiving the base station indication of unable to acquire channel, the UE (100) will restart retxBSR-Timer and increments RETX-BSR-LBT-FAILURE-COUNT by 1.

(i): If RETX-BSR-LBT-FAILURE-COUNT>RETX-BSR-LBT-FAILURE-COUNT-MAX (the value can be configured by RRC), then the UE (100) performs RETX-BSR-LBT-FAILURE procedure.

drx-OnDurationTimer Operation:

(1): The UE (100) starts drx-OnDurationTimer according to the configuration provided for DRX operation at one of the following instances:

(a): The UE (100) starts drx-OnDurationTimer X time units after SFN and subframe where (i): If the Short DRX Cycle is used, and [(SFN×10)+ subframe number] modulo (drx-ShortCycle)=(drx-StartOffset) modulo (drx-ShortCycle) or (ii): If the Long DRX Cycle is used, and [(SFN×10)+ subframe number] modulo (drx-LongCycle)=drx-StartOffset.

(iii): Value of X can be indicated by the base station (200) (e.g. using system information or dedicated configuration or DCI or MAC CE) or can be a predefined value (e.g. value of X can be 0).

(b): The UE (100) starts drx-OnDurationTimer X time units after start of a pre-configured time window, where the time window configuration includes at least time offset of start occasion of time window, time periodicity of time window. For instance, the time window can be Discrete Monitoring Timing Configuration provided to the UE (100), or the time window can be any configuration provided to the UE (100) using dedicated configuration. The value of X can be indicated by the base station (200) (e.g. using system information or dedicated configuration or DCI or MAC CE) or can be a predefined value (e.g. value of X can be 0).

(2): While the drx-OnDurationTimer is running, the UE (100) shall monitor the downlink channel based on one or more of below options:

(a): In an embodiment, when drx-OnDurationTimer is running, the UE (100) monitors for SSB transmission from the base station (200). In further extension of this solution, the UE (100) does not need to monitor for the SSB transmissions from the base station (200) when COT is ongoing (e.g. based on dlCOTActive and dlCOTInactive indications) for the given cell of the base station (200) for which DRX is configured.

(b): In another embodiment, when the drx-OnDurationTimer is running, the UE (100) monitors for any CSI-RS transmission from the base station (200) corresponding to the serving cell (if CSI-RS resources are configured to the UE (100) for the serving cell). In further extension of this solution, the UE (100) does not need to monitor for the CSI-RS transmissions from the base station (200) when the COT is ongoing (e.g. based on dlCOTActive and dlCOTInactive indications) for the given cell of the base station (200) for which DRX is configured.

(c): In another embodiment, the UE (100) monitors for a PDCCH identified by a cell common RNTI value (i.e. a predefined RNTI value or RNTI value configured by the base station (200) e.g. in system information or dedicated configuration). In further extension of this solution, the UE (100) does not need to monitor for the PDCCH transmissions addressed to cell common RNTI from the base station (200) when the COT is ongoing (e.g. based on dlCOTActive and dlCOTInactive indications) for the given cell of the base station (200) for which DRX is configured.

(d): In another embodiment, the UE (100) monitors for a preamble/any transmission from the base station (200) indicating start/end/ongoing COT for the given serving cell of the base station (200). In further extension of this solution, the UE (100) does not need to monitor for preamble/any transmissions from the base station (200) indicating start/end/ongoing COT, when the COT is ongoing (e.g. based on dlCOTActive and dlCOTInactive indications) for the given cell of the base station (200) for DRX is configured.

(e): In another embodiment, the UE (100) monitors for a PDCCH identified by MAC entity's C-RNTI, CS-RNTI, TPC-PUCCH-RNTI, TPC-PUSCH-RNTI, and TPC-SRS-RNTI.

(3): After drx-onDurationTimer is started, the UE (100) initializes a counter ON-DRX-LBT-COUNTER=0

(4): On receiving the base station indication of unable to acquire channel using long LBT, the UE (100) restarts the drx-OnDurationTimer (if running) and increments ON-DRX-LBT-COUNTER by 1.

(5): If ON-DRX-LBT-COUNTER>MAX-ON-DRX-LBT-COUNTER (the value can be configured by RRC), then the UE (100) performs the ON-DRX-LBT-FAILURE procedure.

(6): On successful reception of a PDCCH addressed to C-RNTI of the UE (100), the UE (100) shall stop drx-OnDurationTimer.

drx-InactivityTimer Operation:

(1): The UE (100) starts drx-Inactivity Timer X time units after UE receives the PDCCH indicating a new transmission (DL or UL). Value of X can be configured by the base station (200) (e.g. using system information or dedicated configuration) or can be a predefined value (e.g. value of X can be 0).

(2): While the drx-InactivityTimer is running, the UE (100) shall monitor the downlink channel based on one or more of below options:

(a): In an embodiment, when the drx-InactivityTimer is running, the UE (100) monitors for the SSB transmission from the base station (200). In further extension of this solution, the UE (100) does not need to monitor for SSB transmissions from the base station (200) when the COT is ongoing (e.g. based on dlCOTActive and dlCOTInactive indications) for the given cell of the base station (200) for which DRX is configured.

(b): In another embodiment, when the drx-InactivityTimer is running, the UE (100) monitors for any CSI-RS transmission from the base station (200) corresponding to the serving cell (if CSI-RS resources are configured to the UE (100) for the serving cell). In further extension of this solution, the UE (100) does not need to monitor for CSI-RS transmissions from the base station (200) when the COT is ongoing (e.g. based on dlCOTActive and dlCOTInactive indications) for the given cell of the base station (200) for which DRX is configured.

(c): In another embodiment, the UE (100) monitors for the PDCCH identified by the cell common RNTI value (i.e. a predefined RNTI value or the RNTI value configured by the base station (200) e.g. in system information or dedicated configuration). In further extension of this solution, the UE (100) does not need to monitor for PDCCH transmissions addressed to cell common RNTI from the base station (200) when the COT is ongoing (e.g. based on dlCOTActive and dlCOTInactive indications) for the given cell of the base station (200) for which DRX is configured.

(d): In another embodiment, the UE (100) monitors for a preamble/any transmission from the base station (200) indicating start/end/ongoing COT for the given serving cell of the base station (200). In further extension of this solution, the UE (100) does not need to monitor for preamble/any transmissions from the base station (200) indicating start/end/ongoing COT, when the COT is ongoing (e.g. based on dlCOTActive and dlCOTInactive indications) for the given cell of the base station (200) for DRX is configured.

(e): In another embodiment, the UE (100) monitors for the PDCCH identified by MAC entity's C-RNTI, CS-RNTI, TPC-PUCCH-RNTI, TPC-PUSCH-RNTI, and TPC-SRS-RNTI.

(3): After drx-InactivityTimer is started, the UE (100) initializes the counter IN-DRX-LBT-COUNTER=0

(4): On receiving the base station indication of unable to acquire channel using the long LBT, the UE (100) restarts the drx-InactivityTimer (if running) and increments IN-DRX-LBT-COUNTER by 1.

(5): If IN-DRX-LBT-COUNTER>MAX-IN-DRX-LBT-COUNTER (the value can be configured by RRC), then the UE (100) performs the IN-DRX-LBT-FAILURE procedure.

(6): On successful reception of the DRX Command MAC CE or a Long DRX Command MAC CE, the UE (100) shall stop drx-InactivityTimer.

drx-RetransmissionTimerUL Operation:

(1): The UE (100) starts drx-RetransmissionTimerUL X time units after drx-HARQ-RTT-TimerUL expires. The value of X can be configured by the base station (200) (e.g. using system information or dedicated configuration) or can be a predefined value (e.g. value of X can be 0).

(2): While the drx-RetransmissionTimerUL is running, the UE (100) shall monitor the downlink channel based on one or more of below options:

(a): In an embodiment, when the drx-RetransmissionTimerUL is running, the UE (100) monitors for the SSB transmission from the base station (200). In further extension of this solution, the UE (100) does not need to monitor for the SSB transmissions from the base station (200) when the COT is ongoing (e.g. based on dlCOTActive and dlCOTInactive indications) for the given cell of the base station (200) for which the DRX is configured.

(b): In another embodiment, when the drx-RetransmissionTimerUL is running, the UE (100) monitors for any CSI-RS transmission from the base station (200) corresponding to the serving cell (if CSI-RS resources are configured to the UE (100) for the serving cell). In further extension of this solution, the UE (100) does not need to monitor for the CSI-RS transmissions from the base station (200) when the COT is ongoing (e.g. based on dlCOTActive and dlCOTInactive indications) for the given cell of the base station (200) for which the DRX is configured.

(c): In another embodiment, the UE (100) monitors for the PDCCH identified by the cell common RNTI value (i.e. a predefined RNTI value or RNTI value configured by the base station (200) e.g. in system information or dedicated configuration). In further extension of this solution, the UE (100) does not need to monitor for PDCCH transmissions addressed to the cell common RNTI from the base station (200) when the COT is ongoing (e.g. based on dlCOTActive and dlCOTInactive indications) for the given cell of the base station (200) for which the DRX is configured.

(d): In another embodiment, the UE (100) monitors for a preamble/any transmission from the base station (200) indicating start/end/ongoing COT for the given serving cell of the base station (200). In further extension of this solution, the UE (100) does not need to monitor for preamble/any transmissions from the base station (200) indicating start/end/ongoing COT, when the COT is ongoing (e.g. based on dlCOTActive and dlCOTInactive indications) for the given cell of the base station (200) for the DRX is configured.

(e): In another embodiment, the UE (100) monitors for the PDCCH identified by the MAC entity's C-RNTI, CS-RNTI, TPC-PUCCH-RNTI, TPC-PUSCH-RNTI, and TPC-SRS-RNTI.

(3): After drx-RetransmissionTimerUL is started, the UE (100) initializes a counter RETU-DRX-LBT-COUNTER=0

(4): On receiving the base station (200) indication of unable to acquire channel using the long LBT, the UE (100) restarts the drx-RetransmissionTimerUL (if running) and increments RETU-DRX-LBT-COUNTER by 1.

(5): If RETU-DRX-LBT-COUNTER>MAX-REU-DRX-LBT-COUNTER (the value can be configured by RRC), then the UE (100) performs the RETU-DRX-LBT-FAILURE procedure.

(6): On successful reception of a DRX Command MAC CE or a Long DRX Command MAC CE, the UE (100) shall stop drx-RetransmissionTimerUL.

drx-RetransmissionTimerDL Operation:

(7): the UE (100) starts drx-RetransmissionTimerDL X time units after drx-HARQ-RTT-TimerDL expires and if the data of the corresponding HARQ process was not successfully decoded. Value of X can be configured by the base station (200) (e.g. using system information or dedicated configuration) or can be a predefined value (e.g. value of X can be 0).

(8): While the drx-RetransmissionTimerDL is running, the UE (100) shall monitor the downlink channel based on one or more of below options:

(a): In an embodiment, when the drx-RetransmissionTimerDL is running, the UE (100) monitors for the SSB transmission from the base station (200). In further extension of this solution, the UE (100) does not need to monitor for SSB transmissions from the base station (200) when the COT is ongoing (e.g. based on dlCOTActive and dlCOTInactive indications) for the given cell of the base station (200) for which DRX is configured.

(b): In another embodiment, when the drx-RetransmissionTimerDL is running, the UE (100) monitors for any CSI-RS transmission from the base station (200) corresponding to the serving cell (if CSI-RS resources are configured to the UE (100) for the serving cell). In further extension of this solution, the UE (100) does not need to monitor for the CSI-RS transmissions from the base station (200) when the COT is ongoing (e.g. based on dlCOTActive and dlCOTInactive indications) for the given cell of the base station (200) for which the DRX is configured.

(c): In another embodiment, the UE (100) monitors for the PDCCH identified by the cell common RNTI value (i.e. a predefined RNTI value or RNTI value configured by the base station (200) e.g. in system information or dedicated configuration). In further extension of this solution, the UE (100) does not need to monitor for the PDCCH transmissions addressed to cell common RNTI from the base station (200) when the COT is ongoing (e.g. based on dlCOTActive and dlCOTInactive indications) for the given cell of the base station (200) for which DRX is configured.

(d) In another embodiment, the UE (100) monitors for the preamble/any transmission from the base station (200) indicating start/end/ongoing COT for the given serving cell of the base station (200). In further extension of this solution, the UE (100) does not need to monitor for preamble/any transmissions from the base station (200) indicating start/end/ongoing COT, when the COT is ongoing (e.g. based on dlCOTActive and dlCOTInactive indications) for the given cell of the base station (200) for DRX is configured.

(e): In another embodiment, the UE (100) monitors for the PDCCH identified by MAC entity's C-RNTI, CS-RNTI, TPC-PUCCH-RNTI, TPC-PUSCH-RNTI, and TPC-SRS-RNTI.

(9): After drx-RetransmissionTimerDL is started, the UE (100) initializes a counter RETD-DRX-LBT-COUNTER=0

(10): On receiving the base station indication of unable to acquire channel using the long LBT, the UE (100) restarts the drx-RetransmissionTimerDL (if running) and increments RETD-DRX-LBT-COUNTER by 1.

(11): If RETD-DRX-LBT-COUNTER>MAX-RETD-DRX-LBT-COUNTER (the value can be configured by RRC), then the UE (100) performs the RETD-DRX-LBT-FAILURE procedure.

(12): On successful reception of the DRX Command MAC CE or a Long DRX Command MAC CE, the UE (100) shall stop drx-RetransmissionTimerDL.

UE Actions upon LBT Failure:

Random Access Response Timer Operation: In another embodiment, Below actions taken by the UE (100) on random access response reception failure because of excessive LBT failures or RAR-LBT-FAILURE procedure—

(1): The UE (100) actions on the random access response reception failure because of excessive LBT failures—

(a): In an embodiment, the UE (100) performs the same procedure as ra-ResponseWindow expiry:

(i): the UE (100) increments PREAMBLE_TRANSMISSION_COUNTER by (ii): If PREAMBLE_TRANSMISSION_COUNTER=preambleTxMax+1, then the UE (100) indicates random access problem to upper layers if the PRACH is transmitted on SpCell or the UE (100) considers random access procedure unsuccessfully completed if the PRACH is performed on SCell.

(iii): If in this Random Access procedure, the Random Access Preamble was selected by the MAC among the contention-based Random Access Preambles, the UE (100) selects random backoff timer and delays subsequent attempts by backoff value.

(iv): The UE (100) performs random access resource selection.

(b): In another embodiment, on the RAR-LBT-FAILURE, the UE (100) performs one or more of following actions:

(i): The UE (100) maintains a counter PREAMBLE_LBT_FAILURE, such that at the beginning of random access procedure, the UE (100) sets the value of PREAMBLE_LBT_FAILURE=1. Further, the UE (100) can be configured with a parameter preambleLbtMax in random access configuration.

(ii): If the UE (100) detects the RAR-LBT-FAILURE, the UE (100) increments the PREAMBLE_LBT_FAILURE by 1

(iii): If PREAMBLE_LBT_FAILURE=preambleLbtMax+1, then the UE (100) indicates random access problem to the upper layers if the PRACH is transmitted on the SpCell or the UE (100) considers random access procedure unsuccessfully completed if PRACH is performed on SCell (iv): If in this Random Access procedure, the Random Access Preamble was selected by the MAC among the contention-based Random Access Preambles, the UE (100) selects random backoff timer and delays subsequent attempts by backoff value (v): the UE (100) performs random access resource selection.

(c): In another embodiment, the UE (100) does not increment PREAMBLE_POWER_RAMPING_COUNTER if previous random access transmission attempt resulted in RAR-LBT-FAILURE (d): In another embodiment, the UE (100) de-prioritizes the PRACH transmission using the given SSB/CSI-RS based RACH Resources.

Contention Resolution Timer Operation: In another embodiment, the actions taken by the UE (100) the on contention resolution failure because of LBT failures or CR-LBT-FAILURE procedure—

(1): The UE (100) actions on the random access response reception failure because of excessive LBT failures—

(a): In one embodiment, the UE (100) performs the same procedure as ra-ContentionResolutionTimer expiry.

(i): the UE (100) flushes the HARQ buffer used for transmission of the MAC PDU in the Msg3 buffer;

(ii): the UE (100) increments PREAMBLE_TRANSMISSION_COUNTER by 1

(iii): If PREAMBLE_TRANSMISSION_COUNTER=preambleTxMax+1, then the UE (100) indicates random access problem to upper layers.

(iv): the UE (100) selects random backoff timer and delays subsequent attempts by backoff value.

(v): the UE (100) performs random access resource selection.

(b): In another embodiment, on the CR-LBT-FAILURE, the UE (100) performs following actions:

(i): the UE (100) maintains a counter PREAMBLE_LBT_FAILURE, such that at the beginning of random access procedure, the UE (100) sets the value of PREAMBLE_LBT_FAILURE=1. Further, the UE (100) can be configured with a parameter preambleLbtMax in the random access configuration.

(ii): If the UE (100) detects the RAR-LBT-FAILURE, the UE (100) increments PREAMBLE_LBT_FAILURE by 1

(iii): If PREAMBLE_LBT_FAILURE=preambleLbtMax+1, then the UE (100) indicates random access problem to the upper layers.

(iv): the UE (100) selects random backoff timer and delays subsequent attempts by the backoff value (v): the UE (100) performs the random access resource selection.

(c): In another embodiment, the UE (100) does not increment PREAMBLE_POWER_RAMPING_COUNTER if previous random access transmission attempt resulted in the CONTENTION-LBT-FAILURE.

(d): In another embodiment, the UE (100) de-prioritizes the PRACH transmission using the given SSB/CSI-RS based RACH Resources.

sr-Prohibit Timer Operation: In another embodiment, the actions taken by UE (100) for SR-LBT-FAILURE procedure.

(1): In one embodiment, the UE (100) triggers SR again and increments corresponding SR_COUNTER by 1.

(2): In another embodiment, the UE (100) shall maintain a SR_PROHIBIT_COT_FAIL_RETRY_COUNT, (a): the UE (100) initializes SR_PROHIBIT_COT_FAIL_RETRY_COUNT=0 when the SR is triggered for the first time.

(b): For every, the UE (100) increments SR_PROHIBIT_COT_FAIL_RETRY_COUNT by 1 every time (a): SR-LBT-FAILURE procedure is run for the corresponding SR.

(c): If SR_PROHIBIT_COT_FAIL_RETRY_COUNT>SR_PROHIBIT_COT_FAIL_RETRY_COUNT_MAX (which can be configured by RRC) then the UE (100) will trigger corresponding SR again and increment SR_COUNTER by 1.

(3): In another embodiment, the UE (100) shall maintain a SR_PROHIBIT_COT_FAIL_RETRY_COUNT, (a): the UE (100) initializes SR_PROHIBIT_COT_FAIL_RETRY_COUNT=0 when SR is triggered for the first time.

(b): For every, the UE (100) increments SR_PROHIBIT_COT_FAIL_RETRY_COUNT by 1 every time (a): SR-LBT-FAILURE procedure is run for the corresponding SR.

(c): If SR_PROHIBIT_COT_FAIL_RETRY_COUNT>SR_PROHIBIT_COT_FAIL_RETRY_COUNT_MAX (which can be configured by RRC) then the UE (100) will perform RACH and steps similar to c when SR_COUNTER>=sr-TransMax.

periodicBSR-Timer Operation: In another embodiment, the actions taken by the UE (100) for PERIODIC-BSR-LBT-FAILURE procedure. When PERIODIC-BSR-LBT-FAILURE procedure is triggered the UE (100) shall perform same actions as periodicBSR-Timer expiry.

retxBSR-Timer Operation: In another embodiment, the actions taken by the UE (100) for RETX-BSR-LBT-FAILURE procedure. When the RETX-BSR-LBT-FAILURE procedure is triggered, the UE (100) shall perform same actions as retxBSR-Timer expiry.

drx-onDurationTimer Operation: In another embodiment, when the ON-DRX-LBT-FAILURE procedure is triggered, the UE (100) shall stop drx-onDurationTimer if running.

drx-InactivityTimer Operation: In another embodiment, when the IN-DRX-LBT-FAILURE procedure is triggered, the UE (100) shall stop drx-InactivityTimer if running.

drx-RetransmissionTimerUL Operation: In another embodiment, when the RETU-DRX-LBT-FAILURE procedure is triggered UE shall stop drx-RetransmissionTimerUL if running.

drx-RetransmissionTimerDL Operation: In another embodiment, when RETD-DRX-LBT-FAILURE procedure is triggered, the UE (100) shall stop drx-RetransmissionTimerDL if running.

FIG. 3 is a flow chart S300 illustrating a method, implemented by the base station (200), for handling the timer operation in the wireless communication system (300), according to the embodiments as disclosed herein. The operations (S302-S306) are handled by the processor (210). At S302, the method includes determining whether the COT is started or ongoing. In response to determining that the COT is started or ongoing, at S304, the method includes sending the COT active indication to the UE (100) indicating that the base station (200) has acquired the COT for transmission. In response to determining that the COT is not started or ongoing at S306, the method includes sending the COT inactive indication to the UE (100) indicating that the base station has missed the transmission opportunity due to the LBT failure.

FIG. 4 is a flow chart S400 illustrating a method, implemented by the UE (100), for handling the timer operation in the wireless communication system (300), according to the embodiments as disclosed herein.

At S402, the method includes receiving the signaling message from the base station (200). The signaling message includes the information about acquired COT of the base station (200). At S404, the method includes indicating about the acquired COT to the MAC layer from the physical layer. The physical layer indicates that the base station (200) acquires the COT for transmission or the base station (200) has missed a transmission opportunity due to a LBT failure.

The various actions, acts, blocks, steps, or the like in the flow diagrams S300 and S400 may be performed in the order presented, in a different order or simultaneously. Further, in some embodiments, some of the actions, acts, blocks, steps, or the like may be omitted, added, modified, skipped, or the like without departing from the scope of the invention.

The embodiment disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for handling a timer operation in a wireless communication system (300), comprising:
   determining, by a base station (200), whether a Channel Occupancy Time (COT) is started or ongoing; and
   performing, by the base station (200), one of:
   sending a COT active indication to a User Equipment (UE) (100) indicating that the base station (200) has acquired the COT for transmission in response to determining that the COT is started or ongoing, and
   sending a COT inactive indication to the UE (100) indicating that the base station (200) has missed a transmission opportunity due to a listen-before-talk (LBT) failure in response to determining that the COT is not started or ongoing.

2. The method of claim 1, wherein one of the COT active indication and the COT inactive indication are sent to the UE (100), from the base station (200), based on a signaling message, wherein the signaling message comprises at least one of a layer-1 message, a Medium Access Control-Control Element (MAC CE) message, and a Radio Resource Control (RRC) message.

3. The method of claim 1, wherein the COT inactive indication is send to the UE (100), when the base station (200) has acquired a channel using a short LBT, but the base station (200) is unsuccessful to acquire the channel using a long LBT.

4. A method for handling a timer operation in a wireless communication system (300), comprising:
  receiving, by a User Equipment (UE) (100), a signaling message from a base station (200), wherein the signaling message comprises an information about acquired channel occupancy time (COT) of the base station (200); and
  indicating, by the UE (100), about the acquired COT information to a medium Access control (MAC) layer from a physical layer, wherein the physical layer indicates one of the base station (200) has acquired the COT for transmission and the base station (200) has missed a transmission opportunity due to a listen-before-talk (LBT) failure.

5. The method of claim 4, wherein the signaling message comprises at least one of a layer-1 message, a Medium Access Control-Control Element (MAC CE) message, and a Radio Resource Control (RRC) message, and
  wherein the indication of the signaling message from the base station (200) containing the information about the acquired COT is based on at least one of a search space configuration, a CORESET configuration, and a monitoring time configuration.

6. The method of claim 5, wherein the search space configuration comprises at least one of a time resource for a downlink signal monitoring, an information about at least one of Downlink Control Information (DCI) format, a Synchronization Signal Block (SSB), a Channel State Information Reference Signal (CSI-RS), and a preamble transmission to be monitored by the UE (100),
  wherein the search space configuration is provided for a Physical Downlink Control Channel (PDCCH) monitoring corresponding to at least one of a Random Access Response (RAR) and a Physical Uplink Shared Channel (PUSCH), wherein the UE (100) is configured to monitor one of a separate DCI format, a SSB, a CSI-RS resource, and a preamble transmission from a cell within the search space configuration, and
  wherein the monitoring time configuration comprises at least one of time resources, time periodicity, offset and duration for monitoring at least one of a Synchronization Signal Block (SSB) parameter, a Channel State Information Reference Signal (CSI-RS), and a preamble information.

7. The method of claim 4, further comprises:
  detecting, by the UE (100), that an event to start a MAC timer (140) is satisfied;
  starting, by the UE (100), a COT timer (150) instead of the MAC timer (140) in response to the event to start the COT timer is satisfied;
  receiving, by the UE (100), a COT active indication indicating that the base station (200) has acquired the COT for transmission;
  stopping the COT timer (150) and starting the MAC timer (140) based on the COT active indication,
  stopping or pausing, by the UE (100), the MAC timer (140) and resuming or restarting the COT timer (150) when the UE (100) receives a COT inactive indication indicating that the base station (200) has missed the transmission opportunity based on the LBT failure; and
  stopping or pausing, by the UE (100), the COT timer (150) and resuming or restarting the MAC timer (140) based on the COT active indication,
  wherein the COT timer (150) is provided at least one of a common configuration for each MAC timer (140) and a separate configuration for each MAC timer (140), wherein the MAC timer (140) corresponding to same MAC procedure can have a same independent configuration, and wherein the common configuration is provided based on at least one of a per serving cell, a per bandwidth part, and a per MAC entity basis, and
  wherein a configuration of the COT timer (150) is modified through one of a RRC signalling message, a MAC CE based signalling message, and a DCI based signalling message.

8. The method of claim 4, further comprises: detecting, by the UE (100), a failure event due to the LBT failure on expiry of a COT timer (150), wherein the failure event is a Random Access Response reception failure event, a contention resolution failure event, a scheduling request procedure failure event, a Discontinuous Reception (DRX) procedure failure event, and a buffer status reporting (BSR) procedure failure event,
  wherein the UE (100) performs that at least one of a PREAMBLE_POWER_RAMPING_COUNTER is not incremented and the UE (100) de-prioritizes a PRACH transmission using one of the SSB and the CSI-RS based RACH resources in case of a RAR failure due to the LBT failure,
  wherein the UE (100) triggers a scheduling request (SR) and increments scheduling request (SR) counter by a predefined value, when the UE (100) handles a SR failure based on the LBT failure, and
  wherein the UE (100) maintains a counter value and waits for a counter to exceed an RRC configured threshold value prior to increasing a SR counter and triggering a SR or triggering a RACH, when the UE (100) handles a SR failure based on the LBT failure.

9. The method of claim 4, further comprises: restarting, by the UE (100) the MAC timer (140) upon reception of a COT inactive indication,
  wherein the UE (100) starts a ra-response window based on one of the MAC layer instructs the physical layer to perform a PRACH transmission, the physical layer starts transmission on a first PRACH occasion, and an end of PRACH transmission performed by the physical layer,
  wherein the UE (100) starts a ra-Contention Resolution timer based on at least one of the MAC layer instructs the physical layer to perform a RRC connection request message transmission, the physical layer starts transmission on a symbol/slot of the RRC connection request message, and an end of RRC connection request message transmission performed by the physical layer.

10. A base station (200) for handling a timer operation in a wireless communication system (300), comprising:
  a memory (230); and
  a processor (210), coupled with the memory (230), configured to:
  determine whether a Channel Occupancy Time (COT) is started or ongoing; and
  perform one of:
  send an COT active indication to a User Equipment (UE) (100) indicating that the base station (200) has acquired the COT for transmission in response to determining that the COT is started or ongoing, and
  send an COT inactive indication to the UE (100) indicating that the base station (200) has missed a transmission opportunity due to a listen-before-talk (LBT) failure in response to determining that the COT is not started or ongoing.

11. The base station (200) of claim 10, wherein the COT active indication or the COT inactive indication are sent to the UE (100) based on a signaling message from the base station (200), wherein the signaling message comprises at least one of a layer-1 message, a Medium Access Control-Control Element (MAC CE) message, and a Radio Resource Control (RRC) message, and wherein the COT inactive indication is send to the UE (100), when the base station (200) acquires a channel using a short LBT, but the base station (200) is unsuccessful to acquire the channel using a long LBT.

12. A User Equipment (UE) (100) for handling a timer operation in a wireless communication system (300), comprising:

a memory (130); and a processor (110), coupled with the memory (130), configured to:

receive a signaling message from a base station (200), wherein the signaling message comprises an information about acquired channel occupancy time (COT) of the base station (200); and indicate about the acquired COT information to a medium Access control (MAC) layer from a physical layer, wherein the physical layer indicates one of the base station (200) has acquired the COT for transmission using a COT active indication and the base station (200) has missed a transmission opportunity due to a listen-before-talk (LBT) failure using a COT inactive indication.

13. The UE (100) of claim 12, wherein the signaling information comprises at least one of a layer-1 message, a Medium Access Control-Control Element (MAC CE) message, and a Radio Resource Control (RRC) message, wherein the indication of the signaling message from the base station (200) containing information about the acquired COT of the base station (200) is based on at least one of a search space configuration, a CORESET configuration, and a monitoring time configuration, wherein the search space configuration comprises at least one of a time resource for a downlink signal monitoring, an information about at least one of Downlink Control Information (DCI) format, a Synchronization Signal Block (SSB), a Channel State Information Reference Signal (CSI-RS), and a preamble transmission to be monitored by the UE (100), wherein the search space configuration is provided for a Physical Downlink Control Channel (PDCCH) monitoring corresponding to at least one of a Random Access Response (RAR) and a Physical Uplink Shared Channel (PUSCH), wherein the UE (100) is configured to monitor one of a separate DCI format, a SSB, CSI-RS resource, and a preamble transmission from a cell within the search space configuration, and wherein the monitoring time configuration comprises at least one of a time resource, time periodicity, offset and duration for monitoring at least one of a Synchronization Signal Block (SSB) parameters, Channel State Information Reference Signal (CSI-RS), and preamble information.

14. The UE (100) of claim 12, wherein the processor (110) is configured to:

detect that an event to start a MAC timer (140) is satisfied;

start a COT timer (150) instead of the MAC timer (140) in response to the event to start the COT timer is satisfied;

receive an COT active indication indicating that the base station (200) has acquired the COT for transmission; and stop the COT timer (150) and start the MAC timer (140) based on the COT active indication, wherein the processor (110) is configured to:

stop or pause the MAC timer (140) and resume or restart the COT timer (150), when the UE (100) receives a COT inactive indication indicating that the base station (200) has missed the transmission opportunity due to a LBT failure; and stop or pause the COT timer (150) and resume or restart the MAC timer (140) based on the COT active indication, wherein the COT timer (150) is provided at least one of a common configuration for each MAC timer (140) and a separate configuration for each MAC timer (140) wherein the MAC timer (140) corresponding to same MAC procedure can have the same independent configuration, and wherein the common configuration is provided based on at least one of a per serving cell, a per bandwidth part, and a per MAC entity basis, and wherein the configuration of the COT timer (150) is modified through one of a RRC signalling message, a MAC CE based signalling message, and a DCI based signalling message.

15. The UE (100) of claim 12, wherein the processor (110) is configured to detect a failure event due to the LBT failure on expiry of a COT timer (150), and to restart the MAC timer (140) upon reception of the COT inactive indication, wherein the failure event is a Random Access Response reception failure event, a contention resolution failure event, a scheduling request procedure failure event, a Discontinuous Reception (DRX) procedure failure event, and a buffer status reporting (BSR) procedure failure event, wherein the UE (100) starts a ra-response window based on one of the MAC layer instructs the physical layer to perform a PRACH transmission, the physical layer starts transmission on a first PRACH occasion, and an end of PRACH transmission performed by the physical layer, wherein the UE performs that at least one of a PRE-AMBLE_POWER_RAMPING_COUNTER is not incremented and the UE de-prioritizes the PRACH transmission using the SSB/CSI-RS based RACH Resources in case of a RAR failure due to the LBT failure, wherein the UE (100) starts ra-contention window timer based on at least one of the MAC layer instructs the physical layer to perform a RRC connection message, the physical layer starts transmission on a symbol/slot of the RRC connection request message, an end of the RRC connection request message transmission performed by the physical layer, wherein the UE (100) triggers a scheduling request (SR) and increments scheduling request (SR) counter by a predefined value, when the UE (100) handles a SR failure based on the LBT failure, and wherein the UE (100) maintains a counter value and waits for a counter to exceed an RRC configured threshold value prior to increasing a SR counter and triggering a SR or triggering a RACH, when the UE (100) handles a SR failure based on the LBT failure.

* * * * *